United States Patent [19]

Uyama

[11] Patent Number: 6,029,188

[45] Date of Patent: Feb. 22, 2000

[54] INFORMATION PROCESSING SYSTEM FOR AN ARCHITECTURE MODEL CAPABLE OF INTERFACING WITH HUMANS AND CAPABLE OF BEING MODIFIED

[75] Inventor: Masashi Uyama, Tokyo, Japan

[73] Assignee: Institute For Personalized Information Environment, Tokyo, Japan

[21] Appl. No.: 08/503,673

[22] Filed: Jul. 18, 1995

Related U.S. Application Data

[63] Continuation-in-part of application No. 08/183,988, Jan. 18, 1994, abandoned.

[30] Foreign Application Priority Data

Jan. 18, 1993 [JP] Japan .................................. 5-005602

[51] Int. Cl.[7] .................................................. G06F 9/46
[52] U.S. Cl. .............................................................. 709/102
[58] Field of Search ................................ 709/100–107, 709/300

[56] References Cited

U.S. PATENT DOCUMENTS

| | | | |
|---|---|---|---|
| 4,445,197 | 4/1984 | Lorie et al. ............................ | 709/102 |
| 5,317,688 | 5/1994 | Watson et al. ......................... | 395/161 |
| 5,335,323 | 8/1994 | Kolnick .................................. | 395/164 |
| 5,404,440 | 4/1995 | Asahi ..................................... | 395/155 |

OTHER PUBLICATIONS

Lun et al, Strategies for Real–Time Dialogue and Interaction in Multiagent Systems, IEEE Transactions on Systems, Man & Cybernetics, vol. 22, No. 4, Jul./Aug. 1992.

De Bosschere et al, Some Low–Level Issues in the Implementation of a Shared Blackboard, Euromicro Workshop on Parallel and Distributed Computing, Conf. Date Jun. 27–29, 1993.

Rodden et al. Vista: a user interface for a distributed object–oriented software engineering environment, Software Engineering Journal, Jan. 1992.

Ukelson et al, A Dialogue Manager for Efficient Adaptive Man–Machine Dialogues, Comp. Soft. & Appl. Conf. 1989.

Ciancarini, Coordination Languages for Open System Design, Computer Languages 1990 Conf.

Koivunen et al, HutWindows: An Improved Architecture for a User Interface, IEEE Computer Graphics & Applications Magazine Jan. 1988.

*Primary Examiner*—Lucien U. Toplu
*Attorney, Agent, or Firm*—Armstrong, Westerman, Hattori, McLeland & Naughton

[57] ABSTRACT

In an information processing system for architecture model, which comprises a plurality of software modules divided into independent element functions and a work memory area for reading and writing various information as a shared medium, there are provided a work memory area management module 106 for managing history of task phase descriptions delivered to the work memory area as context information, a bid arbiter module 107 for evaluating bids in contract net protocol using the accumulated context information, and a dialog manager module 105 for explaining course of context dependent processing to the user and for providing means to customize the context dependent processing to the user, whereby the software module groups give and take task phase descriptions via the work memory area using the work memory area access procedure, and the bid arbiter module 107 evaluates bids based on the context managed by the work memory area management module 106 so that module groups are operated according to mutual context.

7 Claims, 25 Drawing Sheets

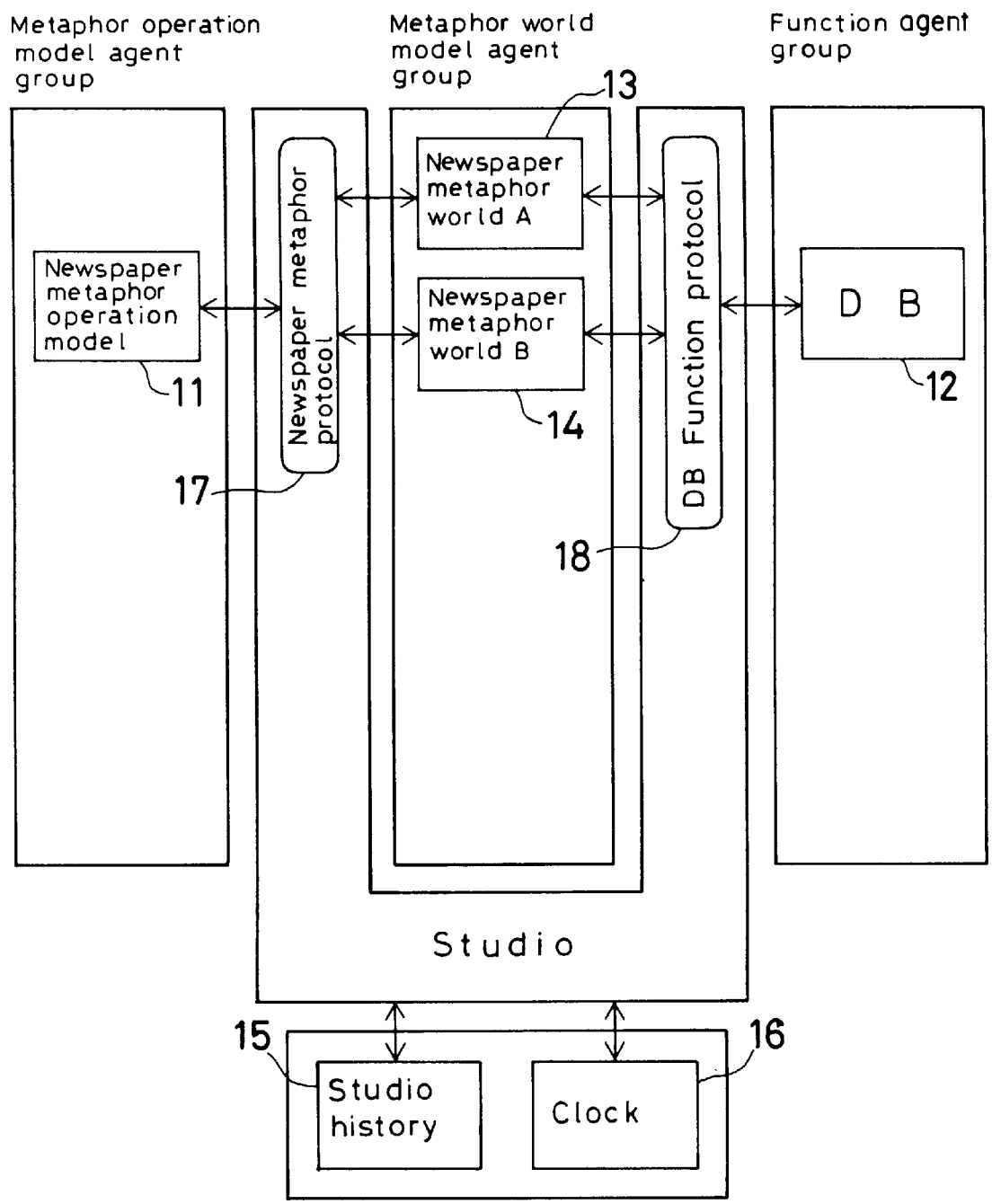

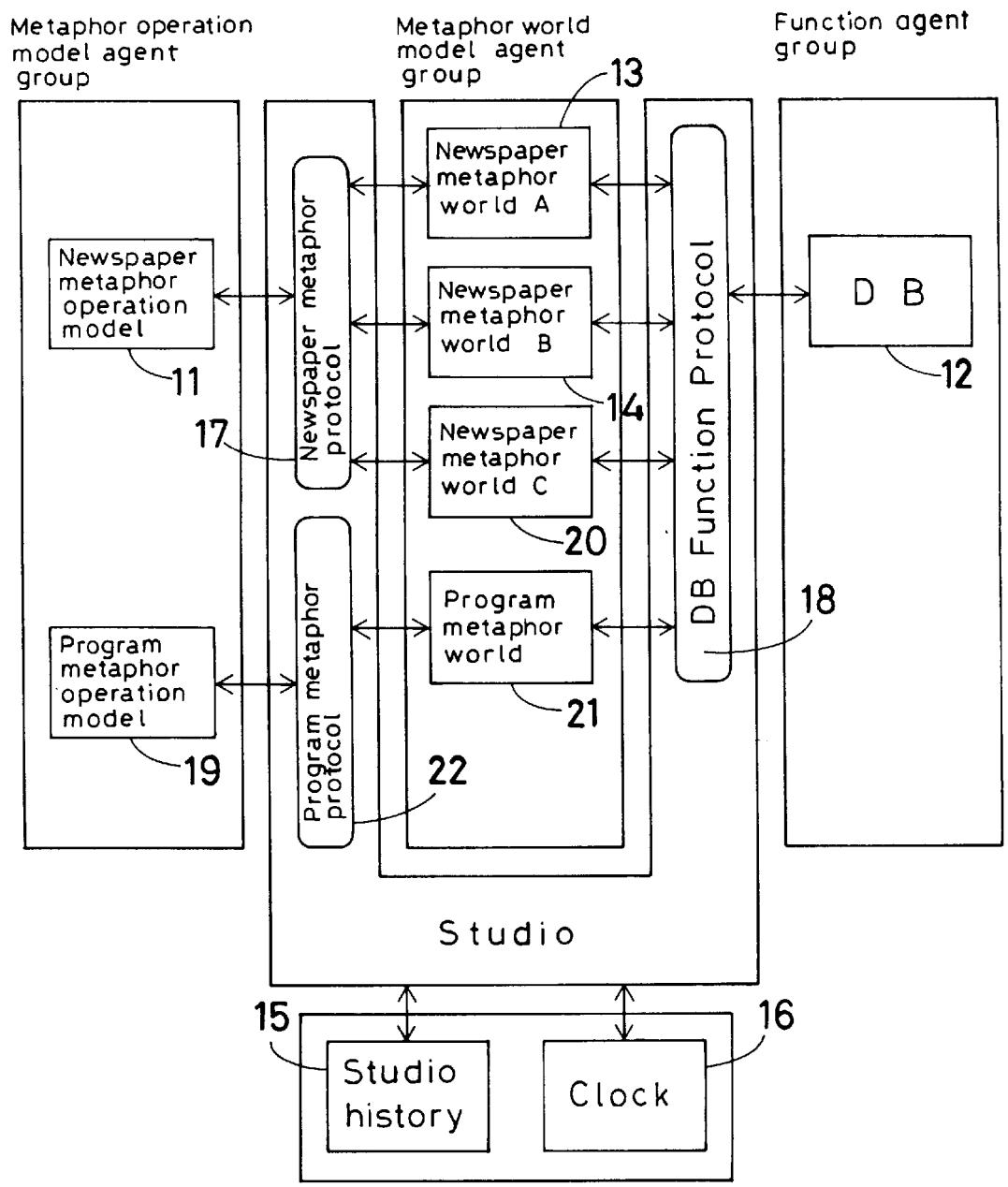

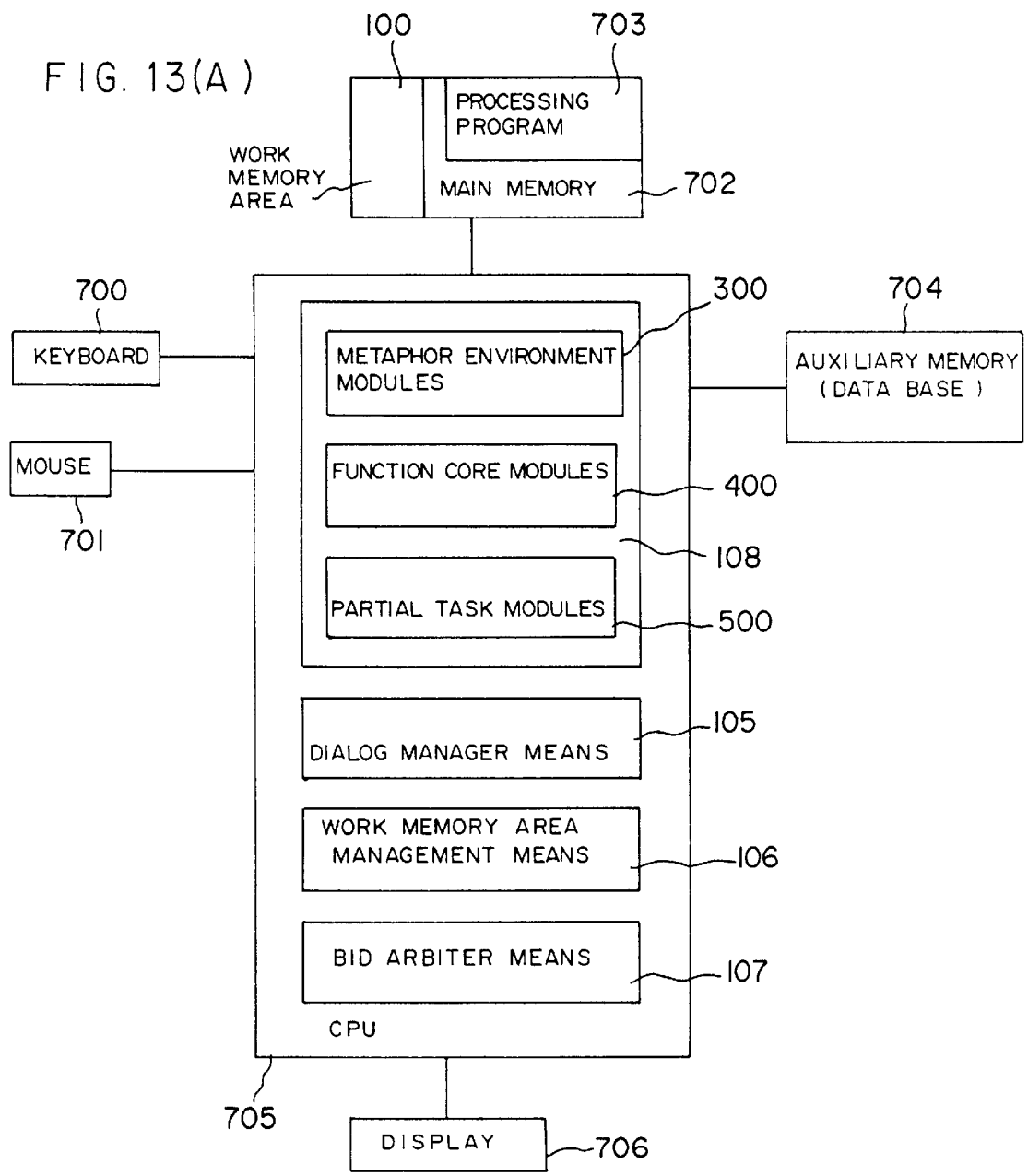

INFORMATION PROCESSING SYSTEM FOR AN ARCHITECTURE MODEL CAPABLE OF INTERFACING WITH HUMANS AND CAPABLE OF BEING MODIFIED

This application is a continuation-in-part of application Ser. No. 08/183,988 filed Jan. 18, 1994, now abandoned.

BACKGROUND OF THE INVENTION

The present invention relates to an information processing system for architecture model of human interface, comprising a plurality of agents divided into independent element functions and a studio for reading and writing various information as a shared medium.

The term "agent" used in the description hereinafter is defined as a basic software module, which takes charge of processing and information relating to human interface (similar to the so-called user interface of man-machine interface) divided into element functions and takes charge of interaction between man and machine. The term "studio" means a work memory area, which shares communication, synchronization and internal data between agents, reads and writes various information consisting of messages and data for dialog between agents as a shared medium accessible from each agent, and temporarily holds such information.

In general, a computer system comprises a plurality of software modules prepared by different design engineers, and addition of a newly designed software module to the system means a possibility to improve the system ability and to increase task executing ability of the user himself. However, the addition of the new module raises a problem that an agreement previously reached between the user and the system may be destroyed.

When the user is utilizing a computer without any trouble, it is considered that some sort of agreement is established between the user and the system. The agreement between user and system means both the knowledge possessed by the user and the knowledge possessed by the system on: (1) mapping of task of the user and function of the system, i.e. to decide which of many functions provided by the system is used to solve which of many goals to be solved when the user executes the task; (2) operation to be performed by the user to the system in order to solve the goal; and (3) feedback to be provided by the system in response to operation of the user.

The knowledge possessed by the system as a part of the agreement is called "task model". By the use of the task model, the system grasps context of task execution of the user and can provide intellectual support to the user. For example, it is possible to achieve automation of routine task, to provide selective choice when decision by the user is needed, or to recognize and teach an act, which is inappropriate in the meaning.

A part of the task model is provided by analysis and preparation of the user's task by a system designer. Vendor in software module group can assume and describe a procedure for the user to solve the goal, using the module groups and the description can be provided to the system as a part of the task model.

However, it is not possible generally for each vendor to predict the entire task of the user because user executes the task using a plurality of tools prepared by different vendors, and the knowledge on task execution provided by each vendor is merely a modelling of a part of user's task. Also, with the knowledge obtained from task analysis at a certain point only, it is not possible to cope with addition of new modules and change of the user's task itself associated with it.

For this reason, the knowledge designed by the vendor or the knowledge obtained by task analysis is not task model properly reflecting user's own task for individual user executing task with a plurality of tools prepared by different vendors, but is a partial task model, prepared by modelling a part of the user's task. One example of the system utilizing the partial task model is POISE system.

A task model is formed only when the partial task model groups given by the system designer or individual vendor are adequately combined and corrected to match actual task execution of the user. To generate the task model, it is necessary to have a function to customize partial task model group for the user or a learning function to automatically correct, by which the system automatically corrects the partial task model. Examples of the systems to provide customizing function to generate task model from partial task model are: HP NewWave environment and HP SoftBench environment.

If we consider a computer system divided into software module group and interface architecture, the software module group is a module group designed and provided by vendor in order to solve the task, which is assumed by the vendor, and the interface architecture is a software, which controls knowledge such as task model, partial task model and plays a role to form an agreement between the user and the system.

In general, a computer system comprises a plurality of software modules prepared by different designers, and addition of newly designed software module to the system provides a possibility to improve system ability and to increase task executing ability of the user himself. However, the addition of the new module raises a problem to destroy the agreement, which had been established between the user and the system.

This agreement is formed through learning of the user himself, adaptation to the user by the system, and customizing of the system by the user. To utilize the new module, it is necessary that the user changes and reconstitutes such knowledges. The necessity to change the knowledge for the user is called destruction of agreement.

FIG. 1 is a diagram showing formation of an agreement by customizing of a partial task model, and FIG. 2 represents destruction of agreement associated with addition of new modules. A system provided with software module groups by a vendor A and a vendor B is shown in FIG. 1, and partial task models PTMA and PTMB, modeling task execution utilizing software module group, are provided to the system by each vendor. To accurately support task execution of the user, it is necessary to have knowledge as to in which combination the modules are used in order to solve task request of the user. These knowledges must be defined by customizing by the user himself or must be found by interface architecture.

FIG. 2 shows a case where new software module group and partial task model are provided by a vendor C under the condition, which is based on the agreement between the user and the system as shown in FIG. 1. In this case, if the method to utilize the existing software module is made public, it is possible to model the task execution, which uses both the newly added module group and the existing module group.

Here, it is supposed that, of task requests of the user, a portion solvable by the partial task model provided by the vendor C includes a portion solvable by the customized task model as shown in FIG. 2. In this case, there has been no other way in the conventional system but to take one of the following steps:

(1) to maintain task execution based on the agreement between the system and the user by neglecting function provided by the vendor C and partial task model;

(2) to abandon the agreement formed between the system and the user and to accept task execution according to the partial task model provided by the vendor C. In this case, the user must change the operating method of the system and the knowledge relating to feedback; or (3) to change the customizing task model to a model applicable to the newly added module by the user himself.

In view of these requests, there are problems in the conventional system, which can have knowledges obtained by modelling the task execution of the user over a plurality of modules as described above.

Conventional Example: POISE

The system utilizing the partial task model is, for instance, POISE system. In POISE system, the knowledge analyzed and prepared for office work using a group of specific tools are given by the system designer as data base of the system. Using the data base, POISE can support office work.

Task Description of POISE

The knowledge of POISE is acquired by analysis of office work and is given as a group of "task description" in data base of the system by the system designer. The task description is described in the form to define a higher-order task by a "lower-order task" or by "starting of tool", using regular expression. With such information provided in the data base, POISE can recognize context of operation of the user and can plan an action corresponding to the context. For example, if the user specifies a specific task, the system is able to plan an execution step, to start the tool automatically, and to make inquiry to the user when necessary.

Problem of POISE System

However, it is not taken into account in POISE to add a new tool to this environment or to add a new task description because the knowledge is prepared for office work, which uses a specific tool group. In order that the new tool and the task description are adequately integrated in the existing environment, the designer must know the method to start the existing tool, or know task name and object name. In POISE system, the protocol as a unit to disclose the information to the designer is not prepared, and a tool to support additional design of the designer is also not provided. For this reason, it is necessary for the designer of the new tool or task description to have full understanding of all descriptions in the current data base.

Conventional Examples: HP NewWave Environment and HP SoftBench Environment

The examples of the system having customizing function to generate a task model from a partial task model are: HP NewWave environment and HP SoftBench environment.

Agent Task Language of HP NewWave Environment

In HP NewWave environment, a series of operation over a plurality of tools prepared by different vendors can be registered when the user describes a script language called "agent task language". In so doing, an agreement is established between the user and the system that the series of operation will be replaced by a single operation called drag of icon.

Problems in HP NewWave Environment

In general, however, the vendor cannot know the script prepared by the user in the agent task language. For this reason, it must be done only by manual operation of the user himself to change the script in order to utilize the function of the newly added modules when new tools are added. This results in high load for the user and causes trouble for the user in utilizing the function of the new tools.

Tool Protocol of HP SoftBench Environment and Encapsulator Description Language

HP SoftBench environment is an environment more integrated than POISE and provides a cooperative mechanism between the tools of deeper level. In HP SoftBench environment, tool protocol to be made public for each type of software module is made public, and this can be considered as a partial task model. The user can customize the method to use a plurality of tools by description language called encapsulator description language and prepare a task model. For example, it is possible to describe a task, which starts main module and notifies the completion of compile to the member of program team when compiler module completes compile.

Program of HP SoftBench Environment

FIG. 3 is a diagram showing problems of HP SoftBench environment. In HP SoftBench environment, the method to use software module is made public as tool protocol. By this, it is possible for a vendor B, who newly designed a software module group B, to design a partial task model B to utilize the function of an existing software module group A as shown in FIG. 3(1). However, by simply publicizing the tool protocol, it is not possible to correct task model of each user for utilizing function of the newly added software module group B as shown in FIG. 3(2). For this reason, there is no other way for the user but to insist on the task model used up to the moment, or to adopt a partial task model provided by the vendor B, or to re-design a task model by programming Encapsulator description language.

Conventional Example: Prior Patent

The instant inventor has already proposed an information processing system for architecture model of human interface in Japanese Patent Application No. 3-172823 (Japanese Patent Laid-Open Publication No. 6-243096). In these architecture models of human interface, the problems of HP SoftBench environment as described above can be partially solved. Specifically, when adding new software module, it is possible to use the task models used up to that moment and to generate a new task model, by which the new function can also be utilized.

For example, to an environment, where a task model is present, which states: "If the date is updated since I have read the newspaper previously, new information is provided. If not so, information is provided by reading the newspaper which I had read previously". The vendor can add a new module group, and it is possible to generate a new task model, utilizing new function as "reading the information found in the program on the newspaper" utilizing the task models used up to the moment such as: "If the date is updated since I read the newspaper or the program previously, the new information is provided on the newspaper. If not so, the newspaper including the information found in the program is provided if information has been found in the program immediately before, and the information found in the newspaper previously is provided if information has been found previously in the newspaper."

According to an information processing system for architecture model of human interface (U.S. patent application Ser. No. 07/567,879; Japanese Patent Application No. 1-222498 (Japanese Patent Laid-Open Publication No. 3-84652), which has already been proposed by the instant inventor, a common area (work memory area) corresponding to blackboard in the blackboard model is called "studio", and the module group to communicate through the studio is called "agent". By a plurality of agents, the task is divided to element functions, and transaction and information relating to human interface are processed, and communication, synchronization and sharing of internal data are performed between a plurality of agents which are coordinated and operated by a studio.

Each agent is an independent software module and can be started according to the state of the studio. One or more agents are started for one purpose. In the information processing system on this model, one studio is a shared medium of all agents. For this reason, when it is desired to add a new agent, there occurs a problem that the agent to be added may give adverse effect on operation of all other agents. Further, when an agent is to be newly designed, aiming to exert influence on a specific portion of operation of the existing agent group, it is necessary to take the specification of all other agents into account, and this means higher cost for the designing.

In this connection, the present applicant filed Japanese Patent Application 3-172823, which discloses an information processing system for architecture model of human interface, by which new agents can be designed without being conscious of all detailed specification and operation of the existing agent group. The information processing system of this model is as described below.

In FIG. 4, a function agent module group 3 is provided with function protocol, which prescribes functions to execute user's task and the procedure for utilizing said function from the other agents. A methaphor operation model agent group 1 is provided with methaphor protocol, which prescribes external appearance for executing interaction with the user necessary for executing user's task and the procedure for utilizing said external appearance from the other agents. A metaphor world model agent group 2 performs mutual conversion of metaphor protocol and function protocol and utilizes all or a part of the function offered by the function agent module group 3 from the metaphor operation model agent group 1. Partial studios 5 and 6 are prepared by dividing a studio used as a shared medium. A system agent group 4 is provided with function common to all agent groups 1 to 3 and can refer to all of the partial studios 5 and 6.

In the information processing system for architecture model of human interface disclosed by the prior invention, all agent groups consisting of function agent group 3, methaphor operation model agent group 1, methaphor world model agent group 2, and system agent group 4 are connected to the studio, and each of the agent groups 1 to 4 communicates through the partial studios 5 and 6 set for each protocol and executes user's task through dispersion and coordination.

In each of the agent groups 1 to 3, the message sent by an agent is delivered only to one of the partial studios 5 and 6 corresponding to the protocol, to which the message belongs, and no reference access is achieved from other than the agent which is connected to said partial studios of the agent groups 1 to 3 and the system agent group 4.

When a certain message delivered to the partial studios 5 and 6 can be received by a plurality of the same type of agent connected to the partial studios 5 and 6, this message is called announce message of contract, and the agent which delivers the announce message is called a contract manager.

A plurality of agents, which can receive the announce message sends bidding message of contract to a contract manager, and the manager evaluates the bidding message by inquiring to studio history agent, and a final receiver of the message is determined by sending a successful bid message to the most suitable agent.

The contract announce message, bidding message, evaluation method of bidding, and successful bid message are made public as a part of the metaphor protocol or the function protocol.

In FIG. 5, a newspaper metaphor operation model agent 11 is a metaphor operation model agent having a newspaper metaphor protocol, which prescribes a procedure for utilizing the newspaper metaphor from the other agents, and performs interaction with the user with external appearance such as newspaper.

DB agent 12 is a function agent having DB function protocol, which prescribes a procedure for utilizing on-line data base function from the other agents and provides on-line data base function to the other agents.

A newspaper metaphor world A agent 13 and a newspaper metaphor world B agent 14 communicate with the newspaper metaphor operation model agent 11 according to the newspaper metaphor protocol and communicate with DB agent 12 according to DB function protocol. Thus, it is a metaphor world model agent to convert the function provided by DB agent 12 to the one utilizable with external appearance as newspaper.

These two newspaper metaphor world model agents utilize different portions of the function provided by DB agent 12. For example, the newspaper metaphor world A agent 13 presents the most up-to-date information to the user, while the newspaper metaphor world B agent 14 presents information, which the user has read previously in external appearance of the newspaper.

The studio history agent 15 accumulates all messages sent to the studio and answers to inquiries from the other agents by scanning the accumulated message history.

In the newspaper metaphor protocol in the above embodiment, message groups for the following contracts are defined. For instance, the message:

"See the newspaper"

is a contract announce message, which is delivered from the newspaper metaphor operation model agent 11 of the metaphor operation model agent group to each of the newspaper metaphor world agents 13 and 14 of the metaphor world model agent group. To this contract announce message, the message form:

"bid α"

shows a form of a bid message, which is delivered from each of the newspaper metaphor world agents 13 and 14 of the metaphor world model agent group. Here, α is an arbitrary message pattern.

In the bidding evaluation procedure, the newspaper metaphor operation mode 1 agent 11 (contract manager), which sent the announce message, inquires a pattern sent into the studio at the latest of all patterns α of the bidding messages to the studio history agent 15.

The studio history agent 15 goes back along the history of the messages accumulated in time series in response to the inquiry, performs matching for these patterns and replies the first coincident pattern, for instance, to the newspaper metaphor operation model agent 11, which is a contract manager.

The newspaper metaphor operation model agent 11 sends a message for notification of successful bid:

"open the newspaper"

to the metaphor world model agents 13 or 14, which made a bid for said pattern.

In case there is no reply from the studio history agent 15 within a predetermined period, these bids are presented to the users for selection.

Detailed description will be given below on the above operation, referring to FIG. 6 to FIG. 8. When a user clicks on the icon newspaper, the newspaper metaphor operation model agent 11 sends a contract announce message:

"read the newspaper"

to the partial studio, and the two agents, i.e. the newspaper metaphor world A agent 13 and the newspaper metaphor world B agent 14, receive the message.

To match this, since the newspaper metaphor world A agent 13 is an agent to present the newest information to the user, it delivers a bidding message such as:

[Bidding [it is * day * month * year today]]

including a pattern to match a message, which is sent by a clock agent 16 serving as a system agent at 0:00 A.M. as shown in FIG. 6B. Similarly, since the newspaper metaphor world B agent 14 is an agent to present the information which the user has seen previously on external appearance of the newspaper, it delivers a bidding message such as:

[Bidding [the newspaper is displayed on screen]]

Then, the newspaper metaphor operation model agent 11 inquires a studio history agent 15 serving as contract manager as to which of the patterns included in these bids has been delivered at the latest as shown in FIG. 7A.

The studio history agent 15 performs pattern matching with the messages accumulated retrospectively in time series and sends back the first matched pattern, e.g. the message [It is * day * month * year today], to the newspaper metaphor operation model agent 11.

Upon receipt of this message, the newspaper metaphor model agent 11 sends a message to notify the successful bid:

[open the newspaper]

to the newspaper metaphor world A agent 13, for example, which made a successful bid for this pattern as shown in FIG. 8.

By this bid, the new information is presented if date is updated since the newspaper was seen previously, or if not updated, the information previously seen in the newspaper is presented.

FIG. 9 shows an example of addition of agent groups to the above example in order to utilize the functions provided by DB agent 12 on external appearance of television program.

In this case, according to the prior invention, the designer can design a program metaphor operation model agent 19 having a program metaphor protocol, which sets forth the procedure to utilize external appearance of television program from the other agents, as a metaphor operation model agent and can design a program metaphor world agent 21 as the metaphor world model agent by referring only to the program metaphor protocol and DB function protocol. In this case, there is no need to consider the newspaper metaphor world A agent 13, the newspaper metaphor world B agent 14, and the newspaper metaphor operation model agent 11, which make communication via the newspaper metaphor protocol.

Further, the designer can design a newspaper metaphor world C agent 20, i.e. an agent capable to change operation of the existing newspaper without considering the details of the existing agents, i.e. the newspaper metaphor world A agent 13, the newspaper metaphor world B agent 14, and the newspaper metaphor operation model agent 11 by referring only to the newspaper metaphor protocol and DB function protocol.

In so doing, the newspaper metaphor world C agent 20 can present the newspaper containing the information presented in the program in case the user has participated in the bidding and has seen the information in the program shortly before. FIG. 10 to FIG. 12 show examples of these operations, to which description will be given below.

First, when icon of the newspaper is clicked by the user, the newspaper metaphor operation model agent 11 delivers a contract announce message:

[see the newspaper]

to the partial studio as shown in FIG. 10A, and three agents, i.e. the newspaper metaphor world A agent 13, the newspaper metaphor world B agent 14, and the newspaper metaphor world C agent receive the message.

To match this, since the newspaper metaphor world A agent 13 is an agent to present the newest information to the user, it delivers a bidding message such as:

[Bidding [it is * day * month * year today]]

including a pattern to match the message, which is delivered by a clock agent 16 serving as a system agent at 0:00 A.M. as shown in FIG. 10B. Similarly, since the newspaper metaphor world B agent 14 is an agent to present the information, which the user has seen previously on external appearance of the newspaper, it delivers a bidding message such as:

[Bidding [the newspaper is displayed on screen]]

including message pattern to the newspaper metaphor operation model agent 11. Also, since the newspaper metaphor world C agent 20 is an agent to present the information, which the user has seen on the program immediately before, it delivers a bidding message such as:

[Bidding [the program is displayed on screen]]

including the message pattern to the program metaphor operation model agent 19.

From these bidding messages, the newspaper metaphor operation model agent 11 inquires to the studio history agent 15 as to which of the patterns containing in these bids has been delivered at the latest as shown in FIG. 11A.

To this inquiry, the studio history agent 15 performs pattern matching with the message accumulated retrospectively in time series as shown in FIG. 11B and sends back the first matched pattern, e.g. the message [the program is displayed on screen] to the newspaper metaphor operation model agent 11.

The newspaper metaphor operation model agent 11 sends a message to notify successful bidding:

[open the newspaper]

to the newspaper metaphor world C agent 20, which made a successful bid on the pattern as shown in FIG. 12.

By the addition of the newspaper metaphor world C agent 20 as described above, the new information is presented on the newspaper if date has been updated since the newspaper or the program was seen previously. If not updated, the newspaper containing the information seen in the program is presented if the information has been seen in the program immediately before, and if the information has been seen on the newspaper, operation can be changed so that the information seen on the newspaper previously is presented.

Problems of the Prior Patent

In the information processing system for architecture model of human interface (Japanese Patent Application 3-172823), the load to change task model for new module by the user himself using contract net mechanism can be substituted to some extent by the vendor and the architecture. The bidding message designed by the vendor can be considered as a partial task model. However, by description of the vendor and bid evaluation by architecture, there remains a possibility that the function not desirable for the user may be executed even though it may be a new function. For this reason, it is necessary for the user to customize with the minimum load required. However, in the prior patent, there is a problem that a mechanism for customizing the bid of the user's contract is not prepared. Also, there is a problem that the operation of the system is not consistent for the user because the procedure to evaluate the bid can be designed for each individual agent. There are also problems that the method to transmit message by the agent and common form of message are not defined.

In the conventional system, the user can select no other way but:

(1) to neglect the function and partial task model provided by the vendor C and to maintain task execution based on an agreement between the system and the user;

(2) to abandon the agreement between the system and the user and to accept task execution according to the partial task model provided by the vendor C. In this case, the user must change the knowledge relating to operating procedure and feedback of the system; or (3) to change the customized task model by the user himself in order to make it applicable for the added modules.

The prior patent (Japanese Patent Application 3-172823) partially solves these problems, while there remain problems such as no preparation of the mechanism for customizing contract; bidding by the user, inconsistency of system operation for the user, method to transmit message by the agent, and no common form for the message.

SUMMARY OF THE INVENTION

To solve the above problems, it is an object of the present invention to provide an interface architecture, which can integrate newly added partial task model to the customized task model. It is another object of the present invention to provide an interface architecture, which can utilize function of the newly added module without changing the knowledge of the user relating to operation or feedback and can solve most of the task requests of the user. Further, it is still another object of the present invention to provide a method, by which the user of interface architecture can combine, change, or customize a part of partial task model. It is still another object of the invention to provide a method, by which the function of the existing software module can be utilized from the newly added partial task model but also the function of the new software module can be utilized from the existing partial task model or customized task model, and context during execution of the newly added module can be referred from the existing partial task model.

To attain the above objects, the information processing system for architecture model of the present invention comprises a plurality of agents divided into independent element functions and a studio for reading and writing various information as a shared medium, whereby there are provided a studio management agent for managing history of task phase description delivered to the studio as context information, a bid arbiter agent for evaluating the bid in contract net protocol using accumulated context information, and a dialog manager agent for providing means to customize context dependent processing to the user, and it is characterized in that agent groups give and receive task phase description using work memory area access procedure group via studio, the bid arbiter agent evaluates the bid based on the context managed by the studio management agent, and the module group operates in response to mutual context.

By the above arrangement, taking note of the task model (knowledge of the user relating to task execution maintained by the system), which is a part of an agreement between the user and the system, it is possible to provide a mechanism for utilizing functions of the newly added modules, while maintaining the agreement between the user and the system as much as possible when new modules are added.

Still other object and advantages of the invention will in part be obvious and will in part be apparent from the specification. The invention accordingly comprises the features of the construction, combinations of elements, and arrangement of parts which will be exemplified in the construction hereinafter set forth, and the scope of the invention will be indicated in the claims.

BRIEF DESCRIPTION OF THE DRAWINGS

FIG. 5 represents an embodiment of the information processing system for architecture model of human interface according to the prior invention;

FIG. 9 represents another embodiment of the information processing system for architecture model of human interface according to the prior invention;

FIGS. 13(A) and 13(B) show an embodiment of the information processing system for architecture model of human interface according to the present invention, in which FIG. 13(A) is a block diagram showing a hardware arrangement usable to realize the information processing system of the present invention, and FIG. 13(B) shows an example of the structure of a studio used in the information processing system;

DESCRIPTION OF THE PREFERRED EMBODIMENTS

Figure 1:
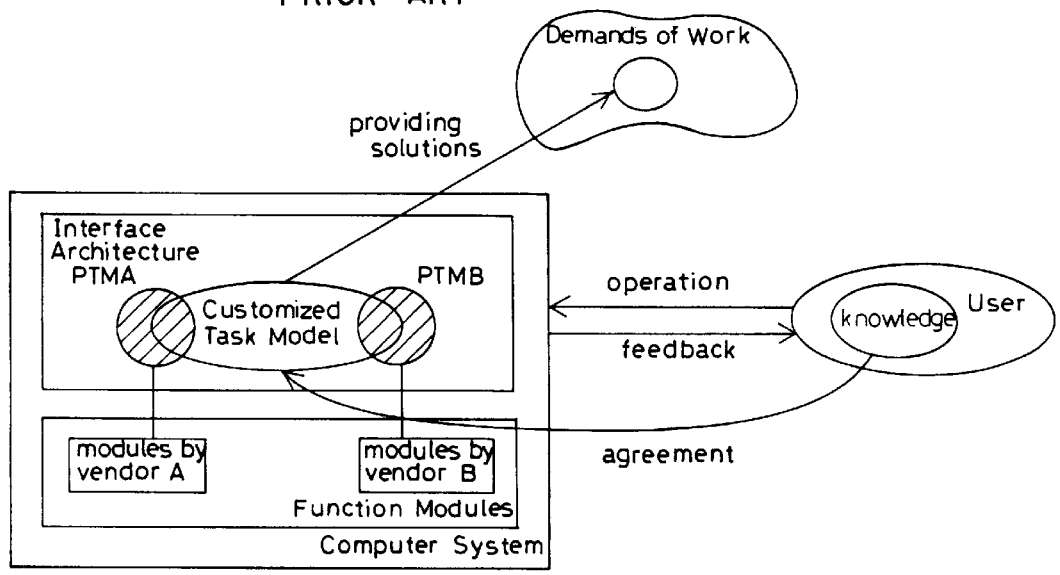
FIG. 1 is a diagram showing formation of an agreement by customizing a partial task model.
Figure 2:
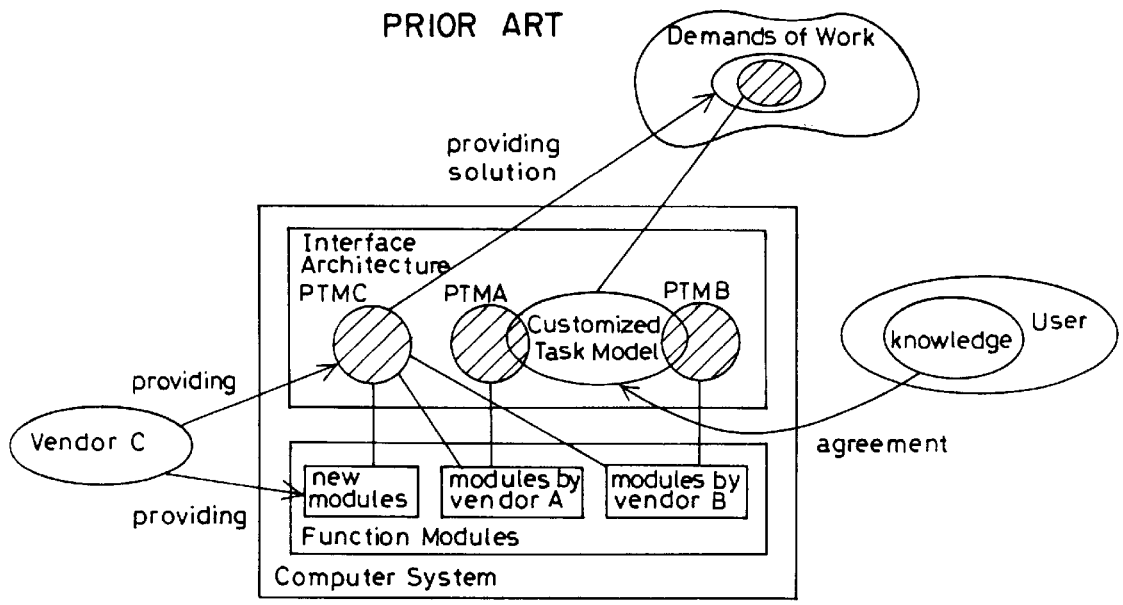
FIG. 2 is a diagram for explaining destruction of the agreement associated with addition of new modules.
Figure 3:
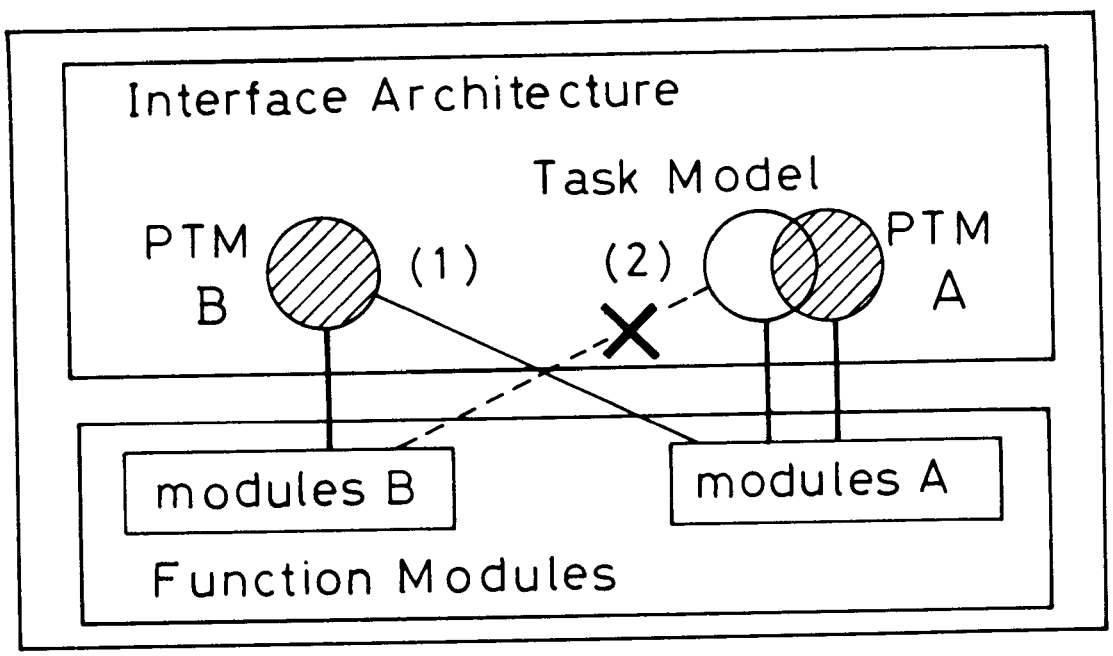
FIG. 3 is a diagram for explaining problems in HP SoftBench environment.
Figure 4:
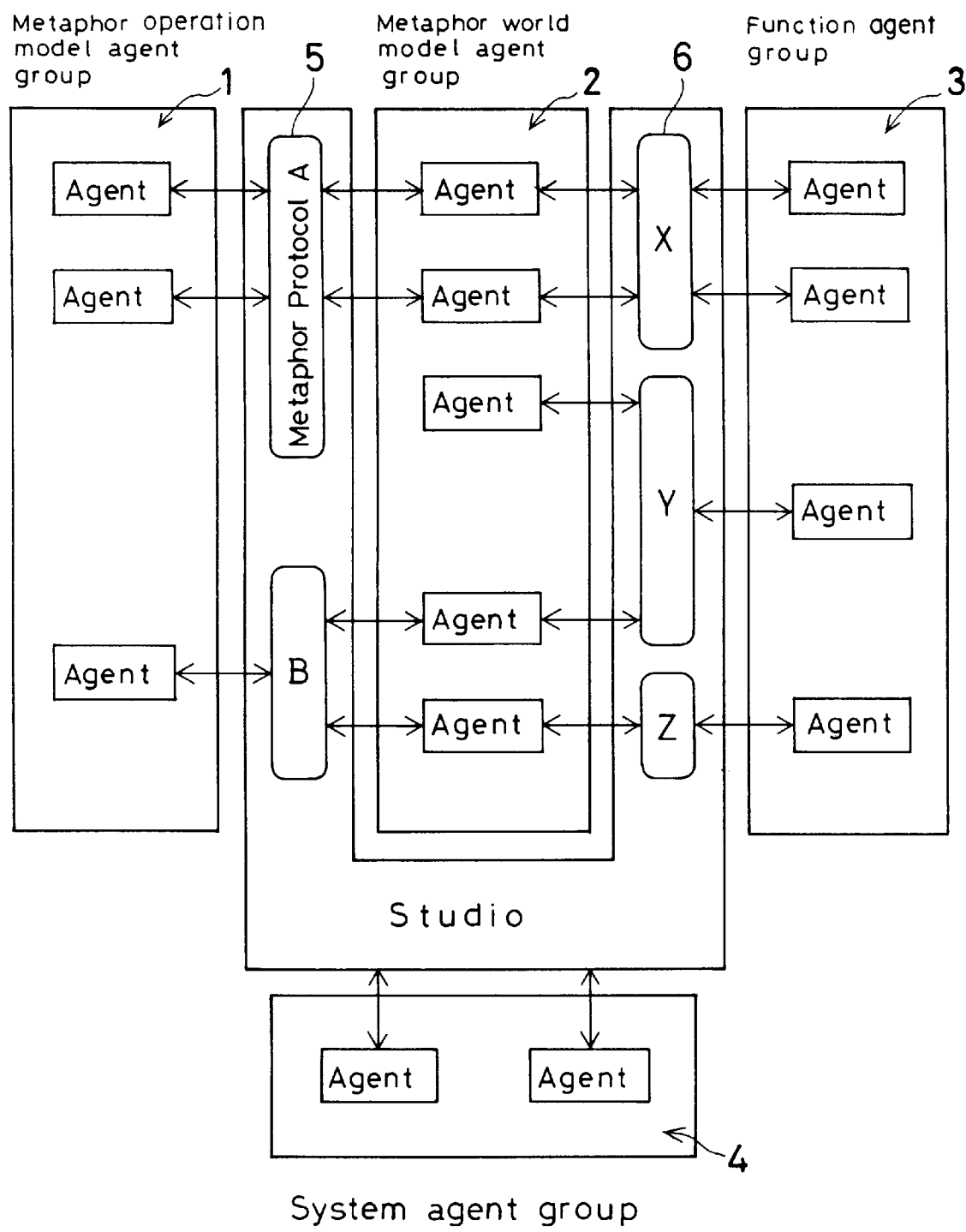
FIG. 4 is a conceptual diagram of an information processing system for architecture model of human interface according to a prior invention.
Figure 6A:
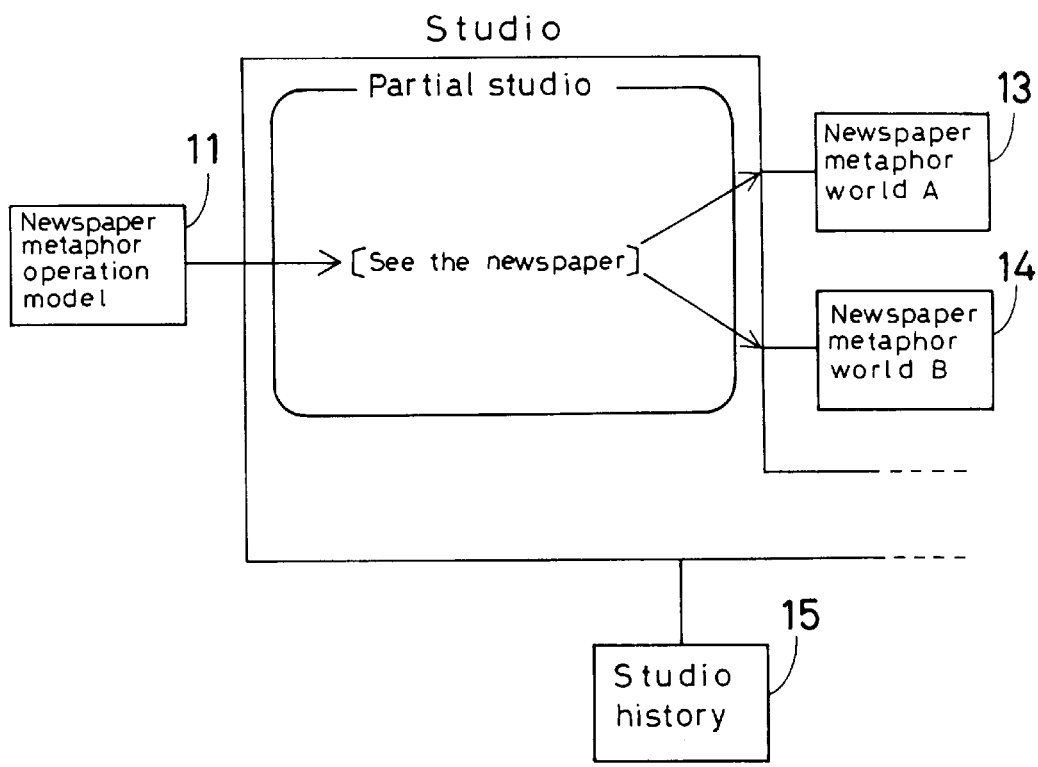
FIG. 6 represents diagram for explaining operation of the information processing system for architecture model of human interface according to the prior invention.
Figure 6B:
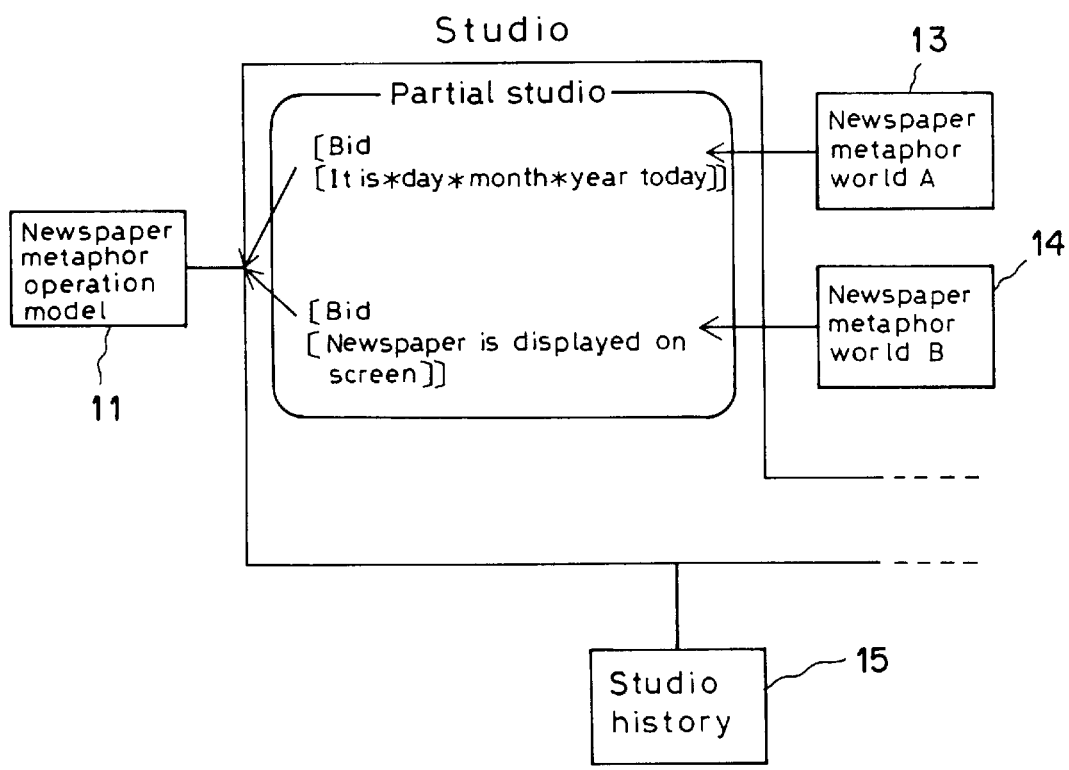
Figure 7A:
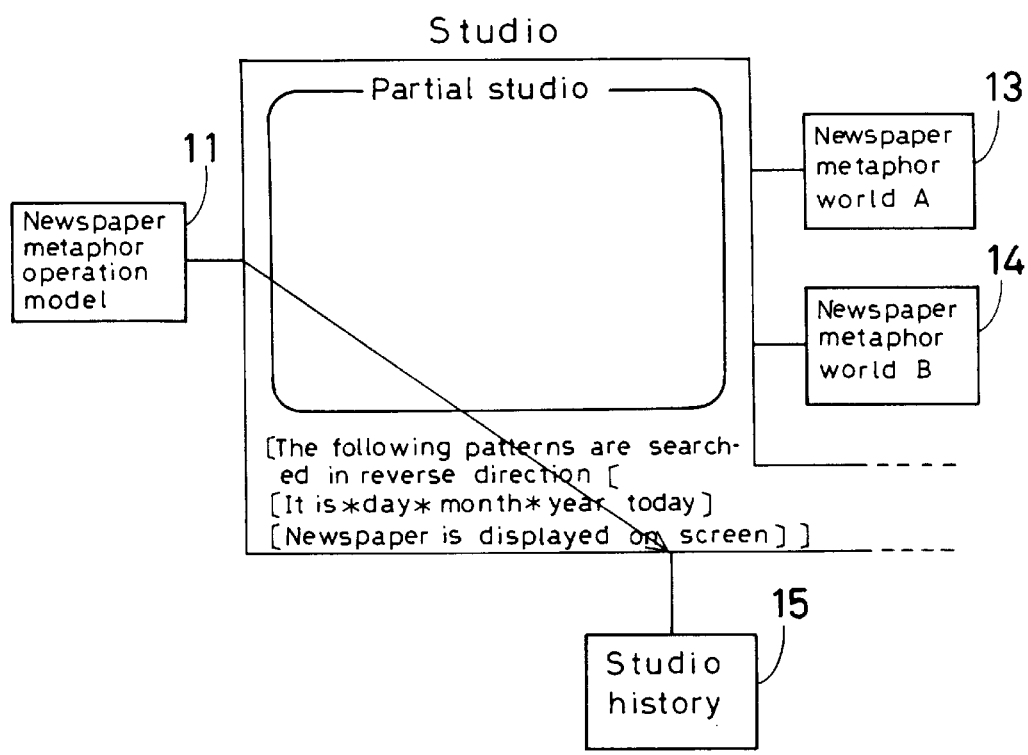
FIG. 7 represents diagrams for explaining operation of the information processing system for architecture model of human interface according to the prior invention.
Figure 7B:
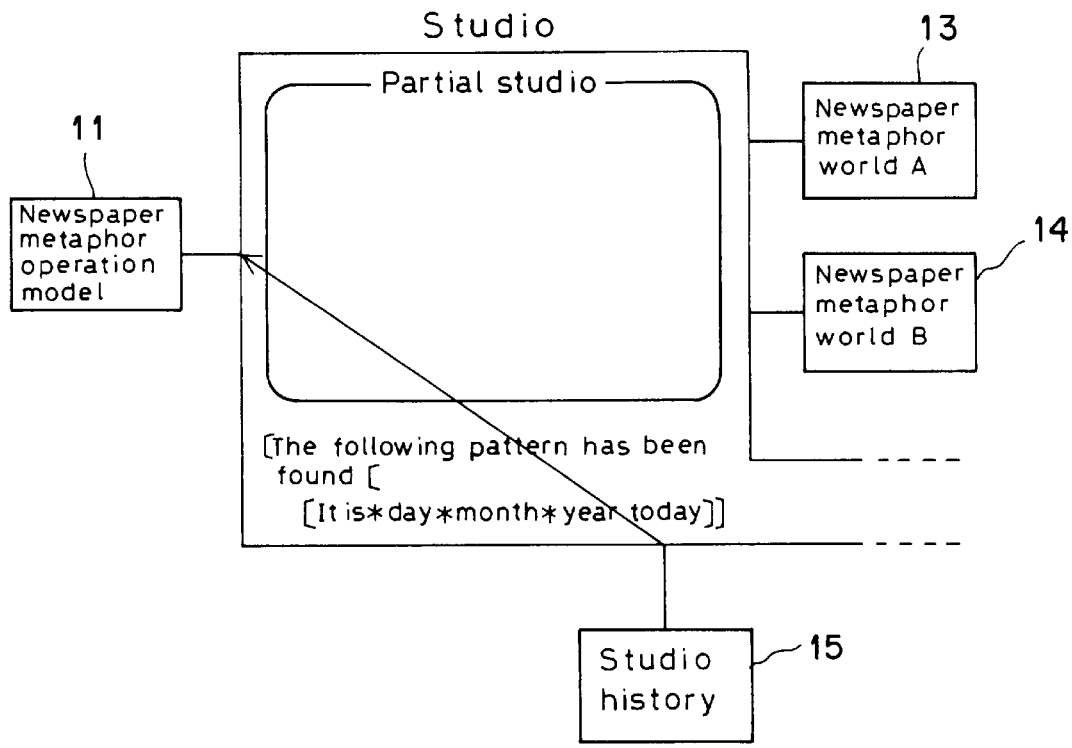
Figure 8:
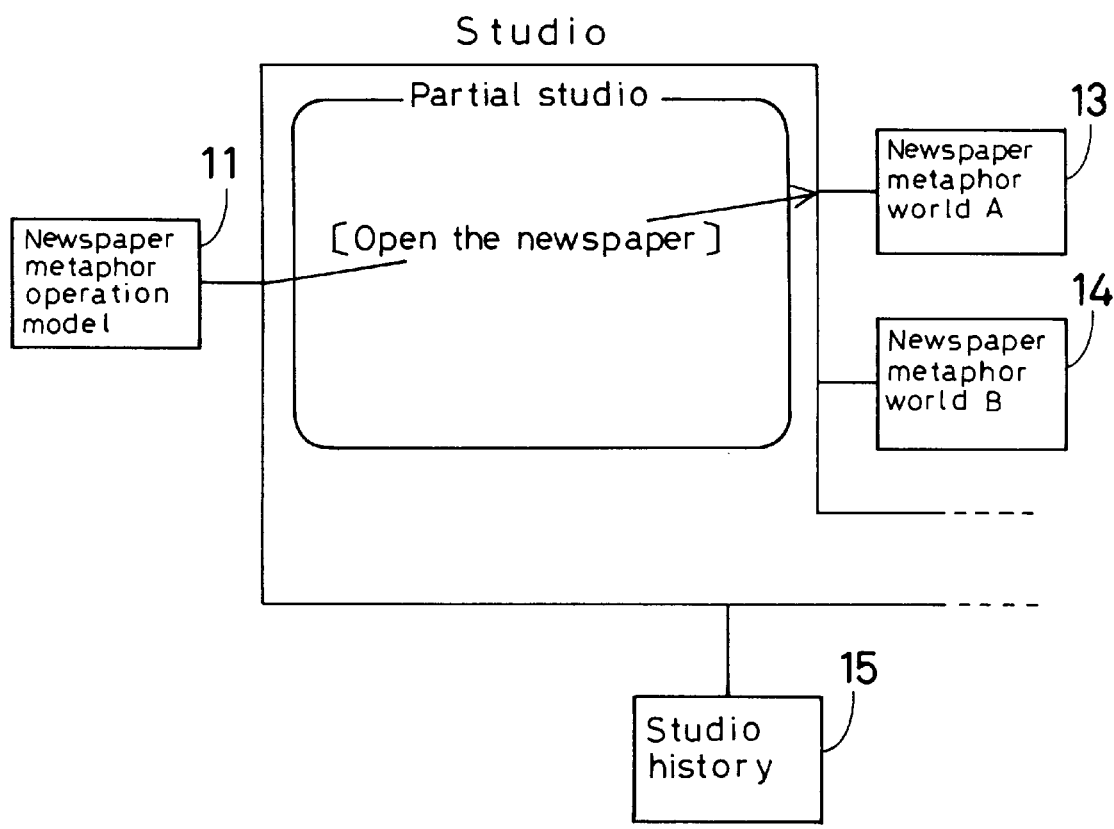
FIG. 8 is a diagram for explaining operation of the information processing system for architecture model of human interface according to the prior invention.
Figure 10A:
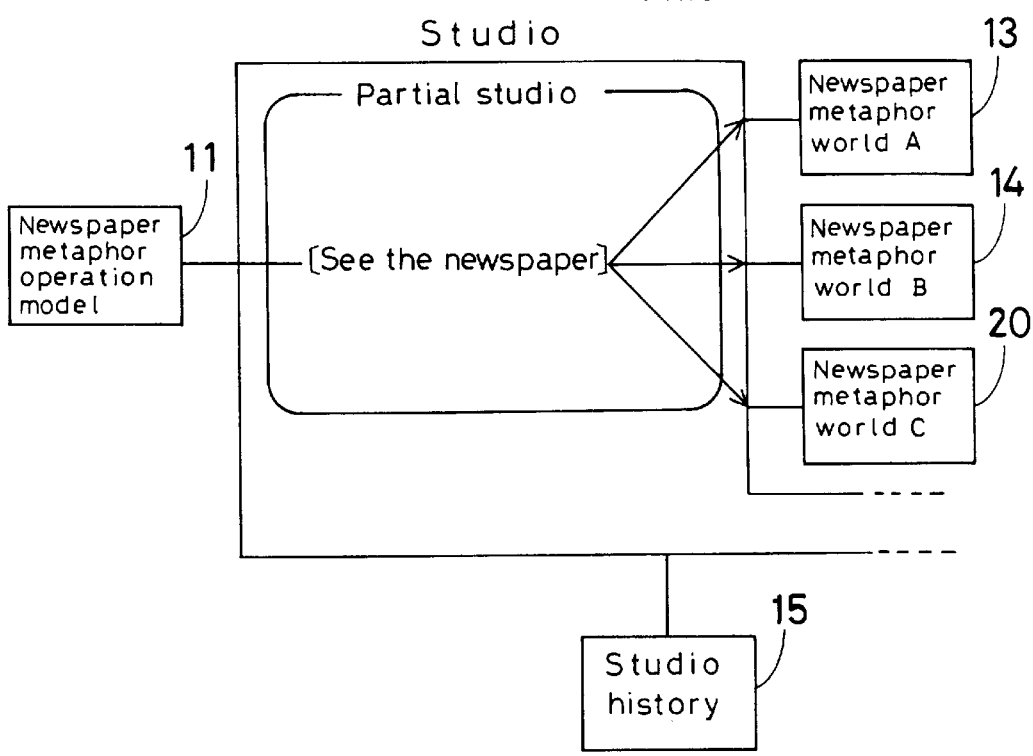
FIG. 10 represents diagrams for explaining operation of the information processing system for architecture model of human interface according to the prior invention.
Figure 10B:
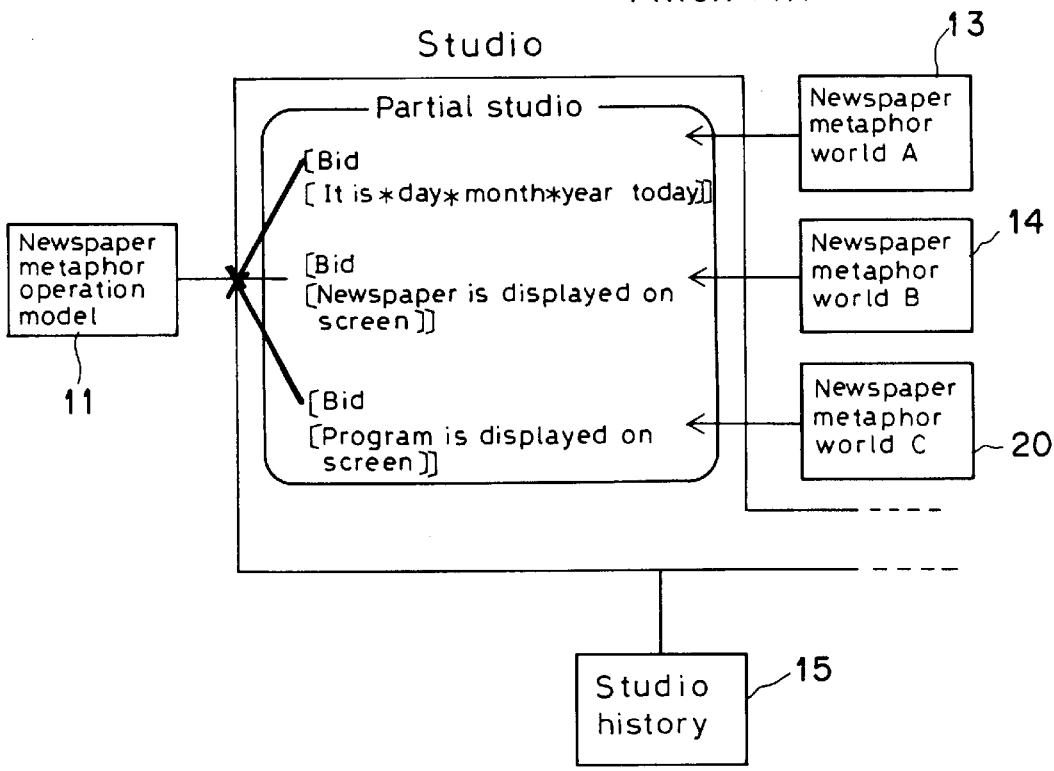
Figure 11A:
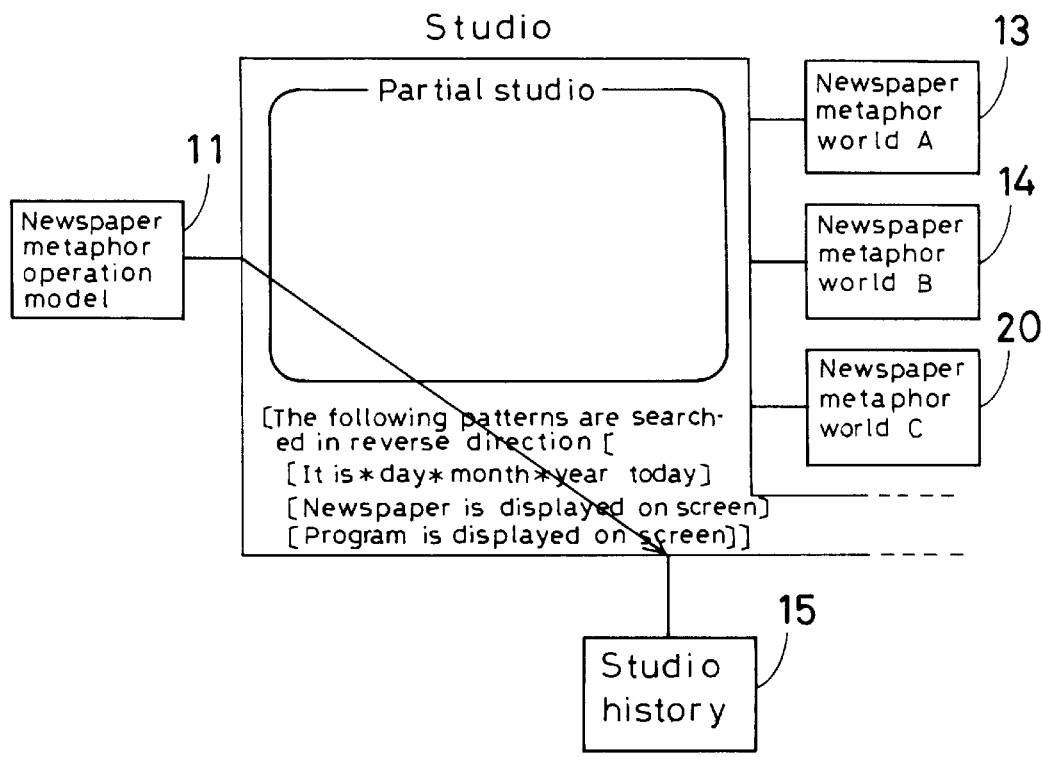
FIG. 11 represents diagrams for explaining operation of the information processing system for architecture model of human interface according to the prior invention.
Figure 11B:
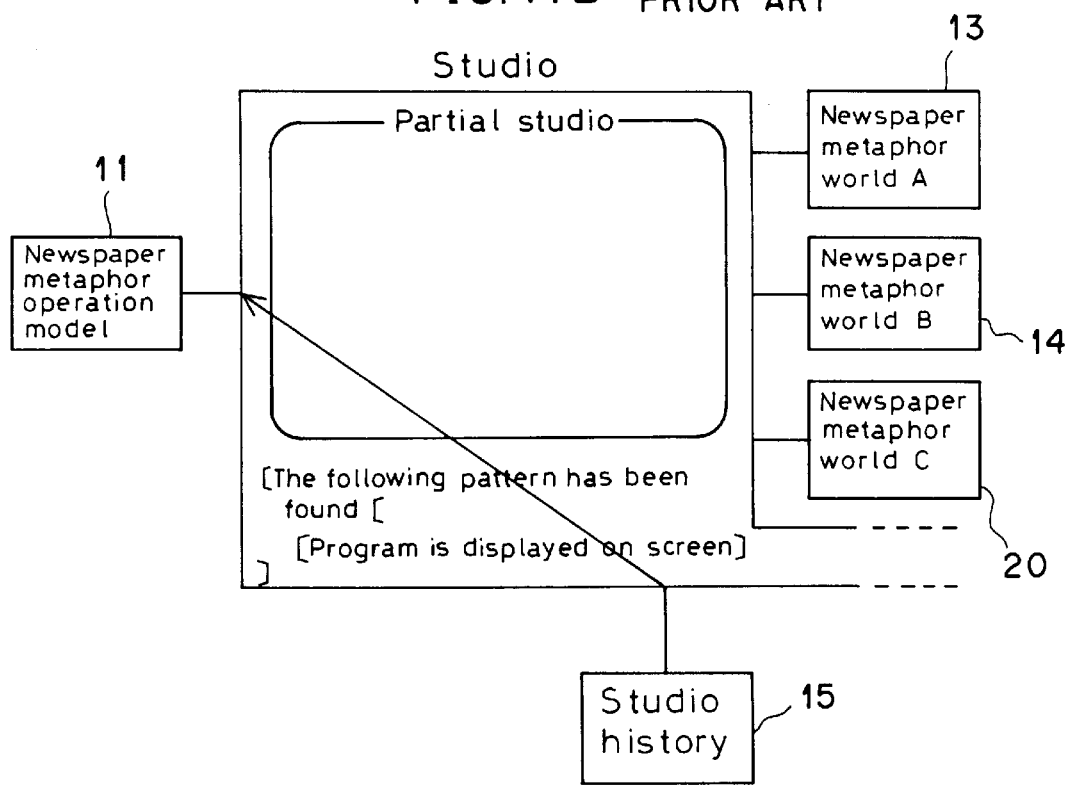
Figure 12:
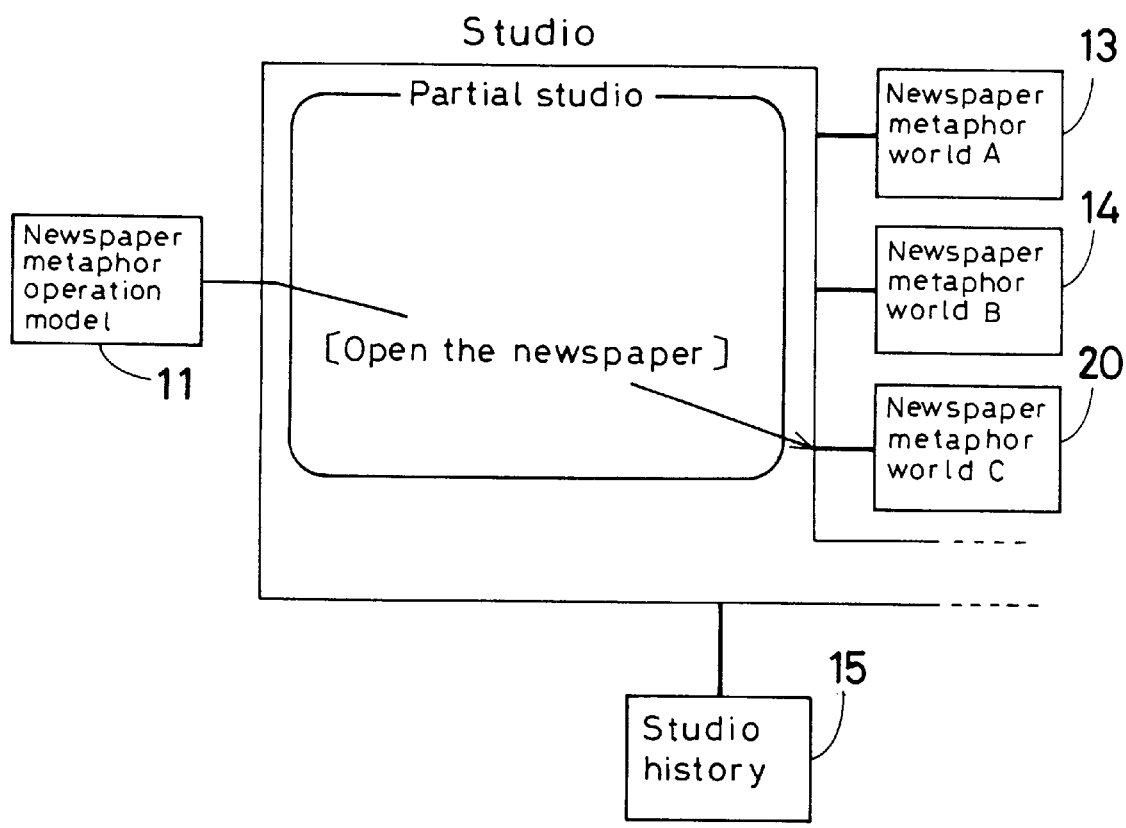
FIG. 12 is a diagram for explaining operation of the information processing system for architecture model of human interface according to the prior invention.

FIG. 13(A) shows a hardware arrangement which is usable to realize the information processing system for architecture model of human interface according to the present invention. The information processing system for architecture model of the present invention includes a CPU (Central Processing Unit) 705 having software modules (later described), a main memory 702, and an auxiliary memory 704 having various data. The information processing system further includes a keyboard 700 and a mouse 701 as input devices, and a display (CRT) 706 as an output device.

The CPU 705 has metaphor environment modules 300, function cord modules 400 and partial task modules 500 as software modules, and further has a dialog manager means 105, a work memory area management means 106, and a bid arbiter means 107. The CPU 705 executes the functions of the metaphor environment modules 300, the function core modules 400, the partial task modules 500, the dialog manager means 105, the work memory area management means 106 and the bid arbiter means 107 according to processing programs 703 which are read out from the main memory 702.

The main memory 702 has a work memory area 100 and stores various processing programs 703 for the metaphor environment modules 300, the function core modules 400, the partial task modules 500, the dialog manager means 105, the work memory area management means 106 and the bid arbiter means 107. Further, the main memory 702 provides a work area necessary for the CPU 705 TO execute processing.

The auxiliary memory 704 provides a data base necessary for processing executed in the CPU 705, and stores data obtained as a result of information processing executed in the CPU 705. The work memory area 100 is connected with the metaphor environment modules 300, the function core modules 400, the partial task modules 500, the dialog manager means 105, the work memory area management means 106, and the bid arbiter means 107. Thus, software modules read and write task phase descriptions from and to the work memory area 100 by using a work memory area access procedure, thereby carrying out communication; and thus, processing a task presented by the user. The CRT 706 displays information such as a customized window, task phase description (TPD) strings matching the context conditions, a contract announce Causal Event string, and a plan executed, together with a metaphor environment (e.g., newspaper).

It should be noted that, in the following description, the metaphor environment modules 300, the function core modules 400, and the partial task modules 500 will be referred to as "metaphor environment agents", "function agents", and "partial task agents", respectively, as general agents 108, and that the dialog manager means 105, the work memory area management means 106, and the bid arbiter means 107 will be referred to as "dialog manager agent", "studio management agent", and "bid arbiter agent", respectively, as essential agents, and further that the work memory area 100 will be referred to as "studio".

Figure 13B:
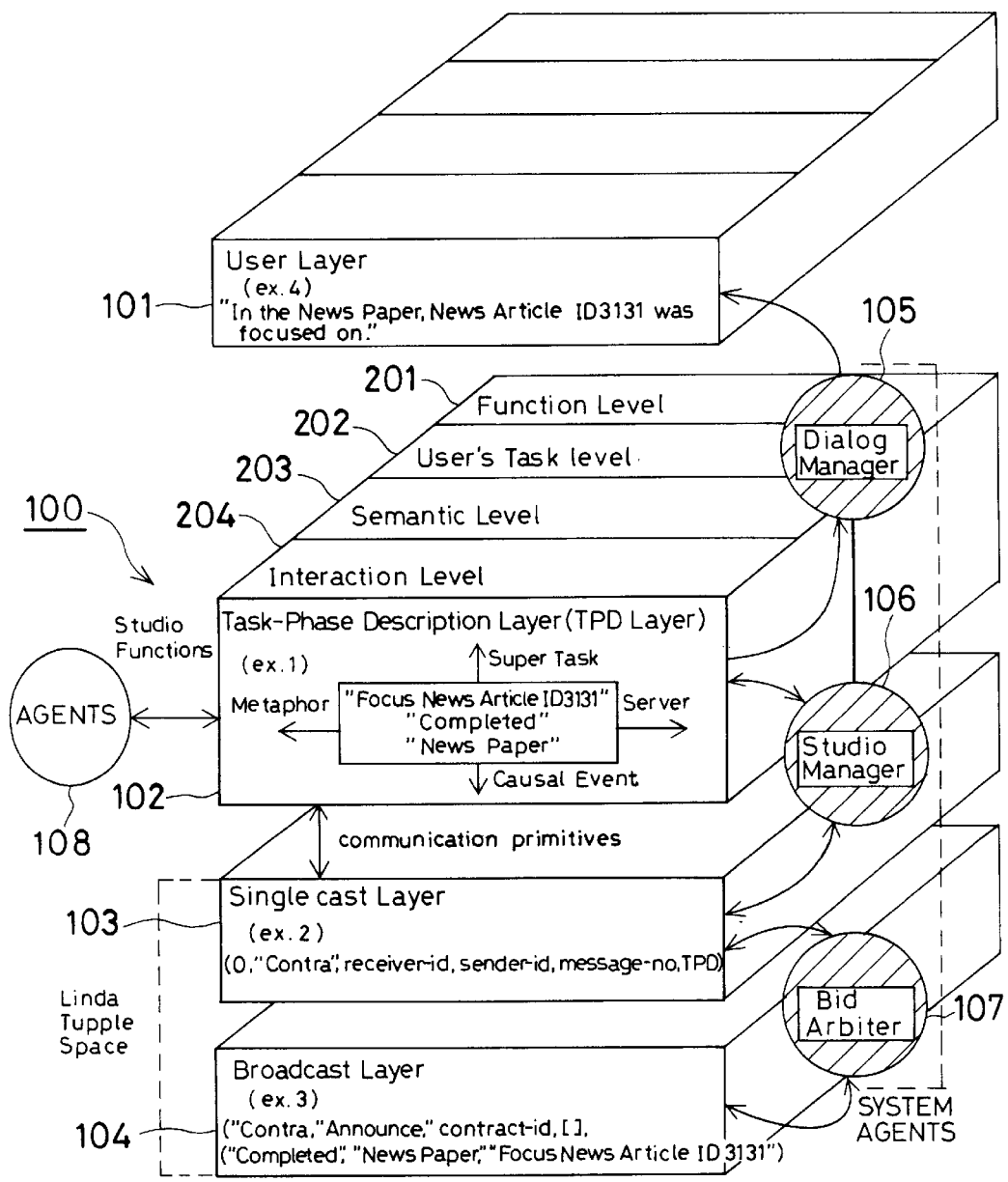

The present invention will be described below in detail. Referring to FIG. 13(B), which shows an example of the structure of a studio in the present invention, a studio 100 comprises 4 layers, i.e. a user layer 10, a task phase description layer 102, a single cast layer 103, and a broadcast layer 104, and is provided with functions (1) to offer means for mutual communication of agent groups; (2) to maintain communication history of agent groups as context information; (3) to offer context dependent processing using contract net protocol; and (4) to explain the context dependent processing to the user and to accept the change of the user.

The functions of the studio 100 are achieved by Tuple Space provided by Linda programming model (product of Scientific Computing Associates, U.S.A.) and by specific agent group called "system agents". The system agents are divided into a "dialog manager" agent 105, a "studio manager" agent 106, and a "bid arbiter" agent 107 as shown in the figure. The "studio manager" agent 106 plays a role to maintain communication history of agent groups as context information. The "bid arbiter" agent 107 accomplishes context dependent processing using contract net protocol by evaluating the bid, and using accumulated context information of the "studio manager" agent 106. The "dialog manager" agent 105 plays an important role in explanation to the user of context dependent processing and in customizing from the user. Work memory area access procedure groups are provided for utilization of studio functions by a general agent group 108.

In the studio 100 having layer structure, agent designer should pay attention only on a task phase description layer 102. The general agent 108 performs communication by reading and writing task phase description (hereinafter referred as "TPD") on the task phase description layer 102 using work memory area access procedure. In the task phase description layer 102, "ex. 1" shows an example of the delivered task phase description. In this way, the task phase description has 3 character strings and 4 pointers as information.

The single cast layer 103 and the broadcast layer 104 are implemented by Tuple Space of Linda, and communication between agents in the task phase description layer 102 is converted to giving and taking of Tuple to and from the broadcast layer 103 and the single cast layer 104, calling communication primitives of the work memory area access procedure within the functions and by final use of Linda primitives by communication primitives.

The single cast layer 103 supports communication to specify a partner agent, and the broadcast layer 104 supports broadcast communication not specifying partner such as contract announce. For example, transmission of task phase description of ex. 1 in the task phase description layer 102 is turned to transmission of Tuple as in ex. 2 in the single cast layer 103, and to transmission of Tuple as in ex. 3 in the broadcast layer 104.

The user should only pay attention on the user layer 101. The task phase description in the task phase description layer 102 is converted to a text format similar to natural language and legible by the user in the user layer 101 and is presented to the user. For example, task phase description of ex. 1 in the task phase description layer 102 is converted to a text as shown in ex. 4 in the user layer 101.

The studio 100 is divided into 4 levels: function level 201, user task level 202, semantic level 203 and interaction level 204 according to the content of the delivered task phase description.

Next, description will be given on the methods to implement the function to provide means for mutual communication between agent groups and the function to maintain communication history between agents as context information.

First, description will be given on task phase description (TPD), which is communication medium between agents and is basic constructing means of context information.

Figure 14:
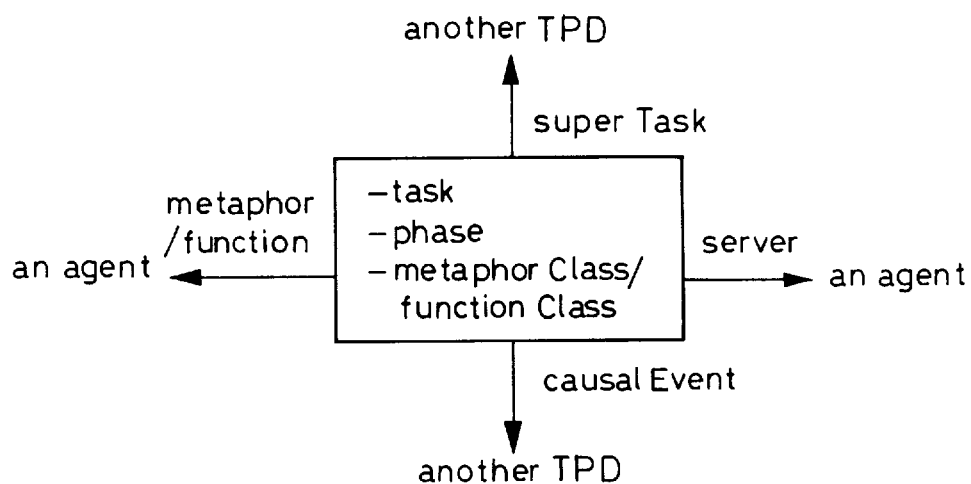
FIG. 14 represents an example of configuration of task phase description.

Each agent performs communication by reading and writing TPD to task phase description layer 102 of the studio 100 using work memory area access procedure. Also, history of TPD delivered to the studio 100 is utilized as context information. TPD comprises 3 character strings and 2 pointers to agents and 2 pointers to TPD as shown in FIG. 14, and these 7 types of information are used for context dependent processing. The meaning of each of the information is as follows:

"Task" is a character string expressing a task, in which phase is described by TPD.

"Phase" (Ph) indicates the status of task and represents character string of "announced", "executing", "completed", "error", or "undefined". "Announced" means a phase where a task to be executed is present but not executed yet. TPD delivered by work memory area access procedure "Metaphor, Call ( )" and "Semantic Command ( )" has this phase. "Executing" means that a task is being executed by a partial task agent specified by server term, using metaphor environment agent of Metaphor term, and the partial task agent and the metaphor environment agent are in contract relationship. "Completed" means a phase where a task has been successfully completed. "Error" means a phase where execution of task has failed. "Undefined" means a phase where the task is riot yet defined. For example, TPD delivered by Metaphor Announce ( ) has this phase, and TPD having this phase is delivered as contract announce.

Metaphor Class (MC) is a character string showing class (type) of metaphor employed as external appearance of task execution. For example, it has a value such as "newspaper", "TV program", etc. "Function class" (FC) is a character string showing class (type) of function of the task execution and has a value such as "DB", "Mail", etc.

Server (SV) is an ID of an agent, which is executing the task.

Metaphor (Mp) is an ID of a metaphor environment agent, which was or is employed by the task.

Super task (ST) is an ID of another TPD on the studio, which describes a task superior to the task. ID of TPD is a part of integers, consisting of ID of an agent to deliver TPD and unique message ID in the agent.

Causal event (CE) is an ID of TPD representing an event, which caused generation of the task.

Figure 15:
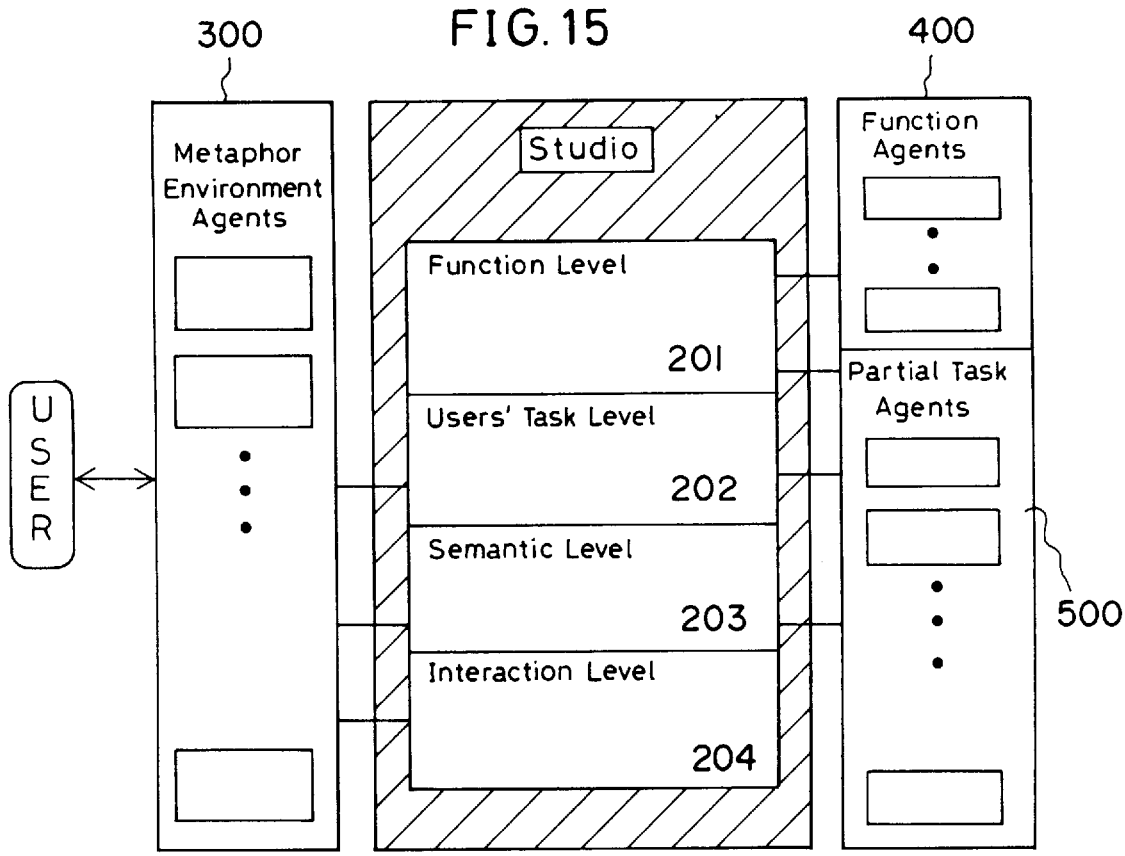
FIG. 15 is a diagram for explaining levels of the studio.

Next, description will be given on work memory area access procedure groups to deliver task phase description to the studio. The studio 100 is divided into 4 levels, i.e. interaction level 204, semantic level 203, user task level 202, and function level 201 as shown in FIG. 15, depending upon types of the TPD delivered. In the interaction level 204, there is syntactic event as a type of TPD. Operation of window level such as mouse click is expressed by TPD, and a metaphor environment agent 300 delivers TPD. In the semantic level 203, there are types of TPD such as semantic event, semantic command, and semantic reply. Dialog is performed between the metaphor environment agent 300 and the partial task agent 500 by TPD, and TPD is given and taken between the metaphor environment agent 300 and the partial task agent 500. In the user task level 202, there are types of TPD such as metaphor announce, metaphor call, execute task and complete task. Contract announce between the metaphor environment agent 300 and the partial task agent 500 as well as execution status of the partial task agent 500 are represented by TPD, and TPD is given and taken between the metaphor environment agent 300 and the partial task agent. 500. On the function level 201, there are types of TPD such as function command and function reply. Dialog is performed between the function agent 400 and the partial task agent 500 by TPD, and TPD is given and taken between the function agent 400 and the partial task agent 500. In this way, as the work memory area access procedure to deliver TPD, 10 types of functions are prepared corresponding to the types of TPD. As the work memory area access procedure to receive TPD, there are three functions of Wait Pattern ( ), Receive ( ), and Wait Call ( ).

The metaphor environment agent has a sizable amount of knowledge on objects of real world (such as newspaper, television) and possesses expression to remind the knowledge to the user. This will be helpful for the user to form an agreement relating to operation and feedback of the system, using knowledge of real world. The procedure to utilize such metaphor environment agent is made public as metaphor protocol.

Metaphor protocol is defined for each metaphor class such as "newspaper", "TV program", etc. and is prescribed in form of task term such as syntactic event, semantic event, semantic command, and semantic reply. It is also prescribed which of semantic event or metaphor announce is issued in response to syntactic event.

Syntactic event and semantic event are TPDs expressing operation of the user to metaphor environment agent. Task term of syntactic event means content of operation of the user executed to metaphor environment agent. Task term of syntactic event gives semantic interpretation to the task term of syntactic event based on contract relationship with partial task agent and transmits it to the partial task agent in contract relationship.

Figure 16:
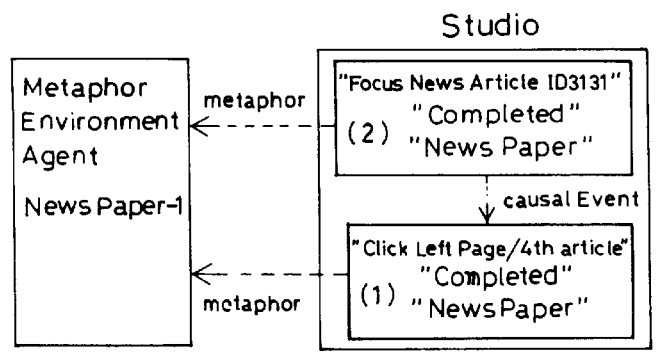
FIG. 16 shows examples of syntactic event and semantic event.

FIG. 16 represents examples of syntactic event and semantic event. The example (1) means that "the user clicked the left fourth article of the newspaper metaphor". To this syntactic event, the semantic event showing that "the user noted the article of ID3131" in (2) is delivered. The semantic event is turned to contract announce.

Semantic command and semantic reply are TPDs and its reply, which are delivered by the partial task agent to the metaphor environment agent in contract relationship in order to change the display to the user.

The function agent is a software module, and the procedure for utilization is made public as function protocol. The function protocol is defined for each function class such as "DB", "Mail", etc. and prescribes format of task term of function command and function reply. Function command and function reply are TPDs and their replies, which are to be delivered by the partial task agent in order to utilize function of function agent.

The partial task agent executing the task requires one metaphor environment agent to present task execution phase to the user. These two agents are supposed to be in contract relationship.

Execute task and complete task mean that the partial task agent specified by the server term is executing or has completed execution of the task term using the metaphor environment agent specified by the metaphor term.

Figure 17:
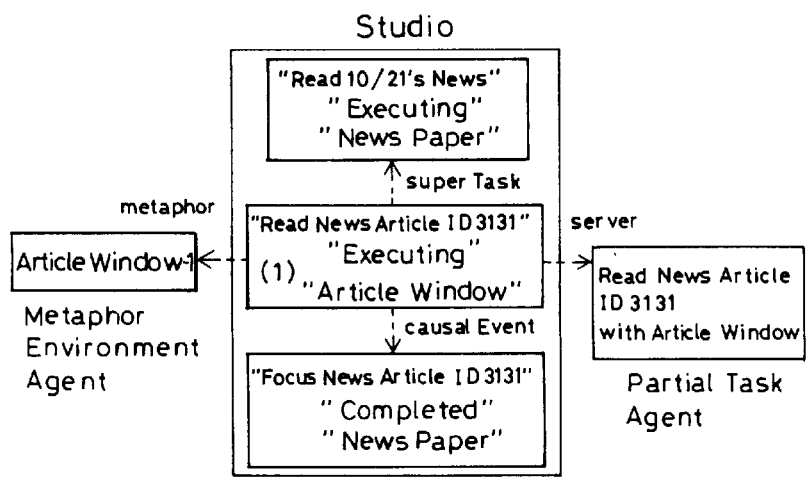
FIG. 17 shows examples of execute task.

FIG. 17 shows an example of Execute Task. TPD (1) means that a task "Read News Article ID3131" has been started as sub-task of "&Read 10/21's News" caused by "Focus NewsArticle ID3131" and is now being executed by two agents in contract relationship. Metaphor term of Execute Task specifies metaphor environment agent, which is in contract relationship with the partial task agent of the server term.

Metaphor Announce and Metaphor Call are TPDs for newly concluding contract relationship. Metaphor Announce is issued as contract announce when the user specifies metaphor environment agent. Metaphor Class term specifies class of metaphor protocol, and all of the partial task agents, which can cope with the metaphor protocol, can participate in bidding. By bid evaluation procedure provided in the studio, the partial task agent bidding the most suitable context condition for the current context is selected, and contract relation is concluded with the metaphor environment agent, which issued metaphor announce.

Metaphor Call is used by the partial task agent having a task to be executed in order to conclude contract relationship with the metaphor environment agent of the class specified in the metaphor class term. The task to be executed after establishment of contract relationship is described in the task term.

Figure 18:
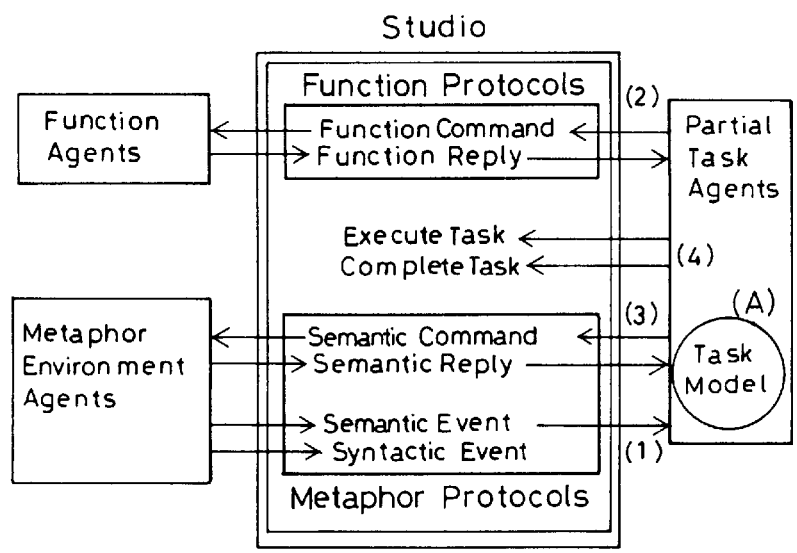
FIG. 18 explains operation of partial task agent groups.

FIG. 18 explains operation of partial task agent groups. Of condition branches dependent on context for task execution in the partial task model, the branching capable to customize is implemented by bidding mechanism of the contract net protocol. By such approach, the partial task model designed by the vendors are divided into a plurality of partial task agents and are implemented.

Each partial task agent has two types of description, i.e. description of task execution format based on contract relationship and description of bidding format to contract announce as partial task model.

First, the description of task execution format based on contract relationship will be:

Semantic Event/Reply →

(Context Condition × Internal status →

(Execute Task + Complete Task +

Function Command + Semantic Command) * )

This partial task model prescribes which TPD string is to be issued in reply to context condition and internal status when semantic event or reply is received from the metaphor environment agent in contract relationship.

The description of bidding format to contract announce will be:

Semantic Event →

(Context Condition × Execute Task)

Metaphor Announce →

(Context Condition × Execute Task)

This partial task model describes under which context condition the bidding should be performed and which task should be executed to make successful bidding to semantic event serving as contract announce and metaphor announce.

The vendor assumes how to use module groups of the user and also how the module groups are to be used. In the description of task execution format based on contract relationship, the task execution, which the vendor assumes that "it should be used in this way and no alteration is allowed" is used for modeling. On the other hand, in the description of bidding format to contract announce, the task execution, which the vendor assumes as customizable by the user or the system, is modeled.

The context condition of bidding is customizable by the user or the system. Since contract announce is made public as a part of metaphor protocol, the other vendor can design an agent to execute bidding.

By correcting and adding these partial task models, it appears that partial task agent groups form a task model as a whole and this makes it possible to perform processing to match context of task execution of the user. Partial task agent group operates as a whole as shown in FIG. 18. Metaphor environment agent receives semantic event issued in response to operation of the user (1), and the most appropriate action is judged by the current context using the task model (A), and one of the following actions (or combination thereof) is executed.

By Function Command, the function of function agent is executed (2).

Semantic Command is issued, and display to the user is changed (3).

By Execute Task/Complete Task, the execution status of the task is announced to the studio (4).

Next, description will be given on the role of "studio manager" agent 106 accumulating history of task phase description as context information.

Mutual relationship between issued TPDs must be maintained as context information, and the "studio manager" agent 106 is the system agent to manage the context information.

The issuance of TPDs by work memory area access procedure is finally delivered as Linda tuple to the single cast layer by communication primitive inform ( ), sendto ( ) and contract ( ). General format of tuple to be delivered to the single cast layer is as follows:

| Receiver | Com | rid | sid | mesno | TPD information |
|---|---|---|---|---|---|

Receiver is an ID of the agent to receive this tuple. In the tuple, which is delivered to the single cast layer by communication primitives called from the work memory area access procedure, 0 is always specified in this term. That is, all of the issued TPDs are first received by the "studio manager" agent 106 of ID=0. After accumulating the received tuples as context information, the "studio manager" agent 106 transfers the tuple to the other agent based on communication type of the tuple.

Communication type (com) indicates communication form of the tuple and has values of "Inform", "Sendto" and "Contra" and these correspond to types of the communication primitives.

receiver-id (rid) has meaning only when communication format is "Sendto" and indicates ID of the agent, which is the final receiver of the tuple.

By two terms of "sender-id (sid)" and "message-no (mesno)", TPD is uniquely identified. "sender-id" is an ID of an agent, which executed communication primitives, and "message-no" is an issuance number, which is uniquely determined within the agent.

As described above, the studio manager agent 106 accumulates the read TPD information together with time stamp and additional information (com, rid, sid, mesno) as TPD history information. In the present invention, this history is used as context information to evaluate contract bidding by the bid arbiter agent 107.

Next, description will be given on a procedure to evaluate utilizing bid format and context information.

Basic policy of bid evaluation is to give a successful bid for the bidder, who is the most appropriate to the context when the contract was announced, and the bid evaluation procedure is provided by the system agent "bid arbiter".

The bidding of contract is executed in form of:

[[Plan] [Context condition string]].

The plan indicates the task to be executed when successful in the contract. The context condition string is a string of the context condition, and the context condition is formed by connecting the conditional expressions described below by "and". When all of the conditional expressions connected by "and" succeeded to the same TPD, it is interpreted that the context conditions matched the TPD.

| always | always successful |
|---|---|
| never | always in fail |
| TPD term == argument | successful if argument and TPD term agree with each other |
| TPD term! = argument | successful if argument and TPD term do not agree with each other |
| TIMESTAMP < ddhhmmss | successful if TIMESTAMP is older than argument |
| TIMESTAMP > ddhhmmss | successful if TIMESTAMP is newer than argument |

The context condition string is a string showing time-related order of each of the context conditions, and it is described in the direction to go back from the present to the past. For example, a bid such as:

[[Plan 1] [

[Task = = "A" and Phase = = "Completed"]

[Task = = "B" and Phase = = "Completed"]

]

indicates the assertion of the bidder, stating: "If a task A has been completed and a task B had been completed before that, I am appropriate for executing Plan 1.".

In a certain context, there may be two or more bids, in which context conditions are established. An evaluation procedure is needed to select a bid most specific to the context from these bids. The bids are evaluated by the "bid arbiter" agent. This is because it is more easily understood for the user to evaluate the bid by a single bid evaluation rule than by a plurality of bid evaluation rules.

The bid evaluation rule of the present invention is very simple as described below. The studio manager agent accumulates TPDs in time series.

Figure 19:
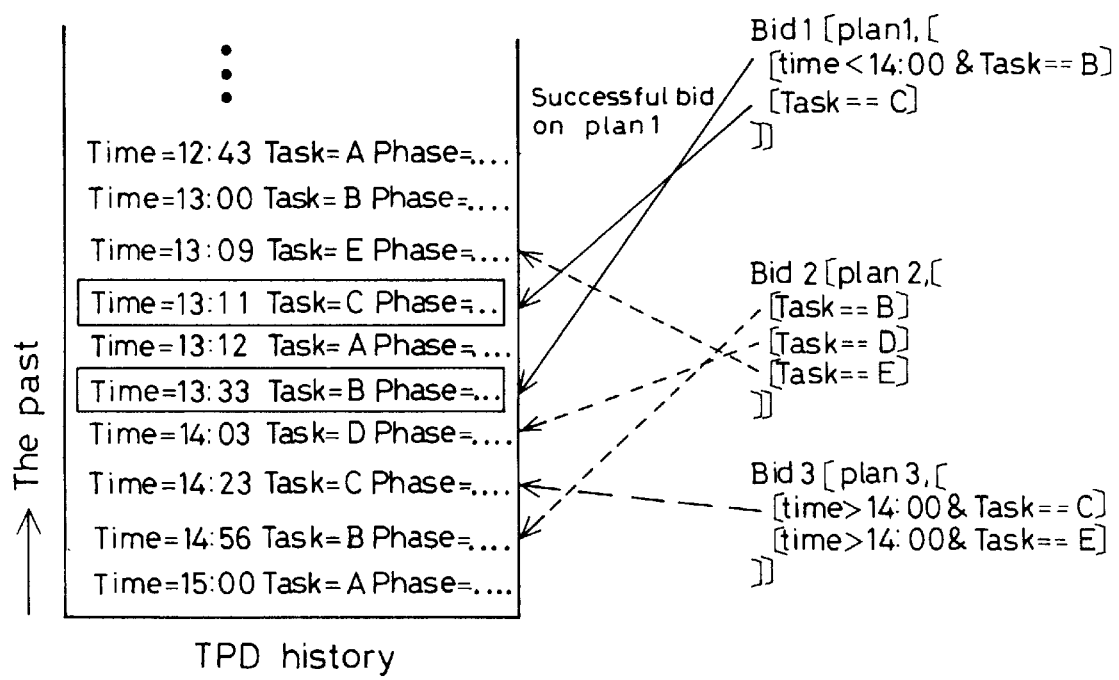
FIG. 19 represents examples of bid evaluation.

The bids are evaluated through pattern matching of context condition string of each bid and TPD history managed by the studio manager agent. As an example of bid evaluation in FIG. 19, it comprises the steps of going back TPD history, performing pattern matching of elements of each context condition string, and successful bid is given to an agent, which bid with all context conditions matched first. In this case, the bidder makes successful bid on Plan 1 with the two context conditions matched first.

Next, the present invention will be described, referring to concrete examples.

There is an environment where "a tool (Tool A) is present, in which information is searched on external appearance such as newspaper". The designer of Tool A designed it in such manner that, when the tool is started, the action is divided into the following two actions by context at the starting.

| If "this tool was started already once today", |
|---|
| → the newspaper is displayed as it was at the time when it was completed previously at the last completion. |
| If "this tool is started for the first time today", |
| → The articles of the newspaper is re-constituted using the new information of this day, and it is displayed from the first page. |

It is supposed that "another tool (Tool B) to search the information by external appearance such as news program" is newly added to this environment. In this case, even when Tool A and Tool B are prepared by different designers, the user would regard the system as an integrated one. Therefore, it is considered that there may be users who may expect the following action when Tool A is started.

---
If "Tool B was used immediately before",
→ The page of the newspaper including the information which was read by Tool B is displayed.

---

Condition branching dependent on the context is performed by contract net protocol, and contract announce and bid format are made public. As a result, the designer can design and add an agent to present new functions to the user along the context of the present task execution of the user.

The designer of newspaper metaphor environment provided the following four agents:

---
"Newspaper metaphor": Metaphor environment agent
"see today's news newly on the newspaper":
                        Partial task agent
"DB":               Functional agent

---

The metaphor announce when the user clicked newspaper icon is made public as a part of the newspaper metaphor protocol and is in the following format:

---
Task = "", Phase = "Undefined", MetaphorClass = "Newspaper"

---

The partial task agent "see today's news newly on the newspaper" makes a bid to search updating of the date such as:

---
[[see today's news newly on the newspaper]; Plan
    [time < 0:00 of the same day]; context condition
]]

--- and the partial task agent "see the news of x day of x month subsequently" makes a bid to search an instruction to open the newspaper issued previously such as:

---
[[see the news of x day of x month on the newspaper subsequently]; Plan
    [[Task = = "Open Newspaper" and
      Phase = = "Completed" and
      MClass = = "Newspaper" and
    ]    ; context condition
]]

---

As a result, if today's news has been read after updating of the date, the subsequent news can be read. If not so, the news of the day newly searched from "DB" can be read.

The designer of program metaphor environment (corresponding to Tool B) can add "program metaphor" and design the partial task agent "see the news seen on television on the newspaper" as described below. Thus, the designer can be change action when newspaper icon was clicked.

---
[[see the news seen on television, on the newspaper];
Plan
    [[Task = = "Open TV Program" and
      Phase = = "Completed" and
      MClass = = "TV Program"]   ; context condition
]]

---

As a result, tinder the context, in which the date is updated and "TV program" is opened more recently than the newspaper, the bid of the newly added agent "see the news seen on television on the newspaper" will succeed in the bidding.

Next, description will be given on Excuse-Customize processing.

Problem often rises that the context assumed by the user and the context assumed by the vendor are different from each other. In such case, according to Excuse-Customize processing, context dependent processing over a plurality of agents is presented in a form legible for the user, and the user can change it. In order to prevent reproduction of inconsistency of context, the user expresses his intention by interrupt button when inconsistency occurs according to Excuse-Customize processing. Also, it is possible to construct unique task execution style of the user by instructing correct context to the system when necessary.

Figure 20:
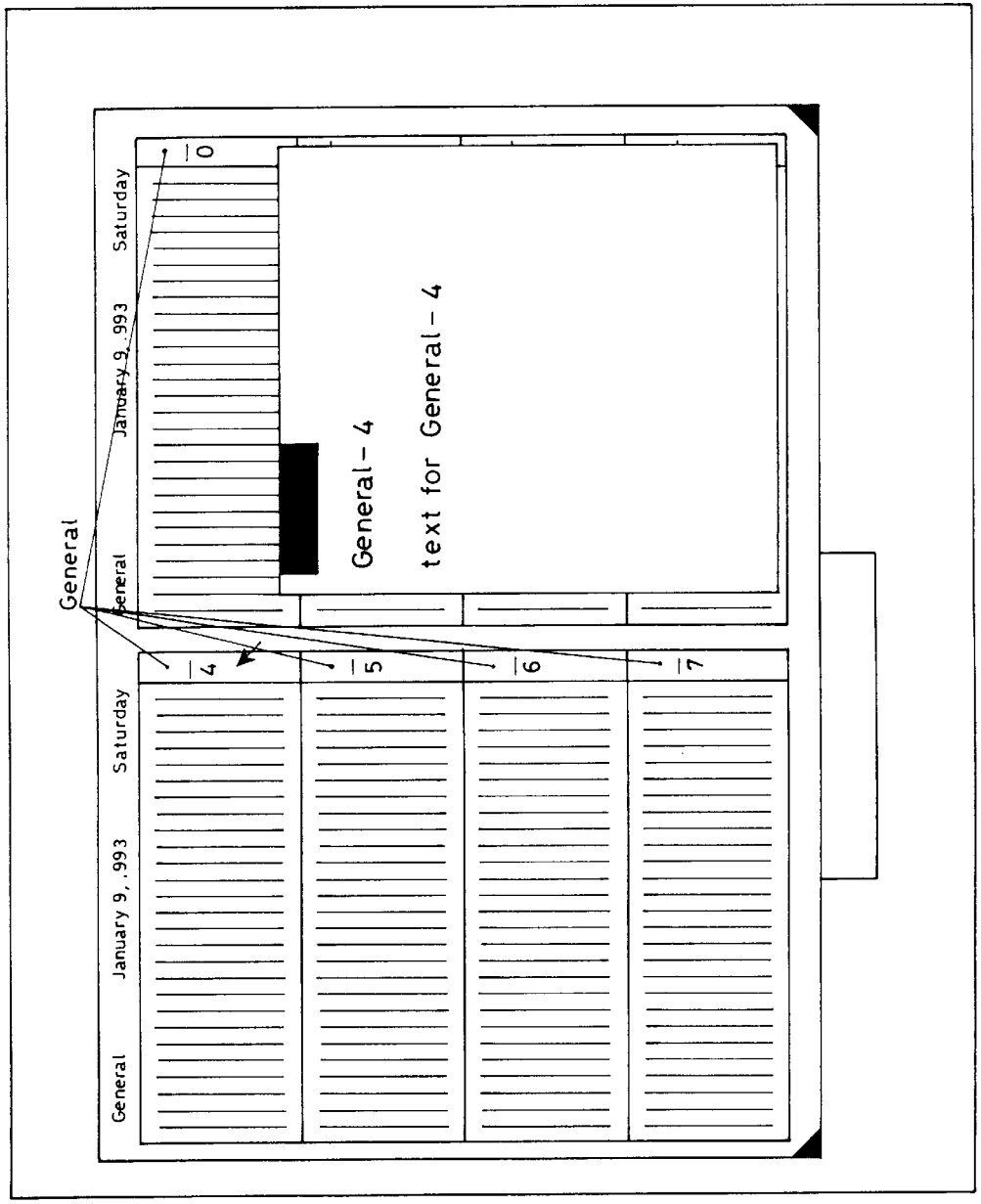
FIG. 20 represents an example of a screen indicating inconsistency of context between the system and the user.

FIG. 20 shows a case where the user clicked again the article which had been read in the window and wanted to start the function to save the article to a scrap book, but the system merely opened the window again.

(1) When the system performs unexpected action, the user can raise objection by the interrupt button. The system apologizes by voice to the user without delay.

Figure 21:
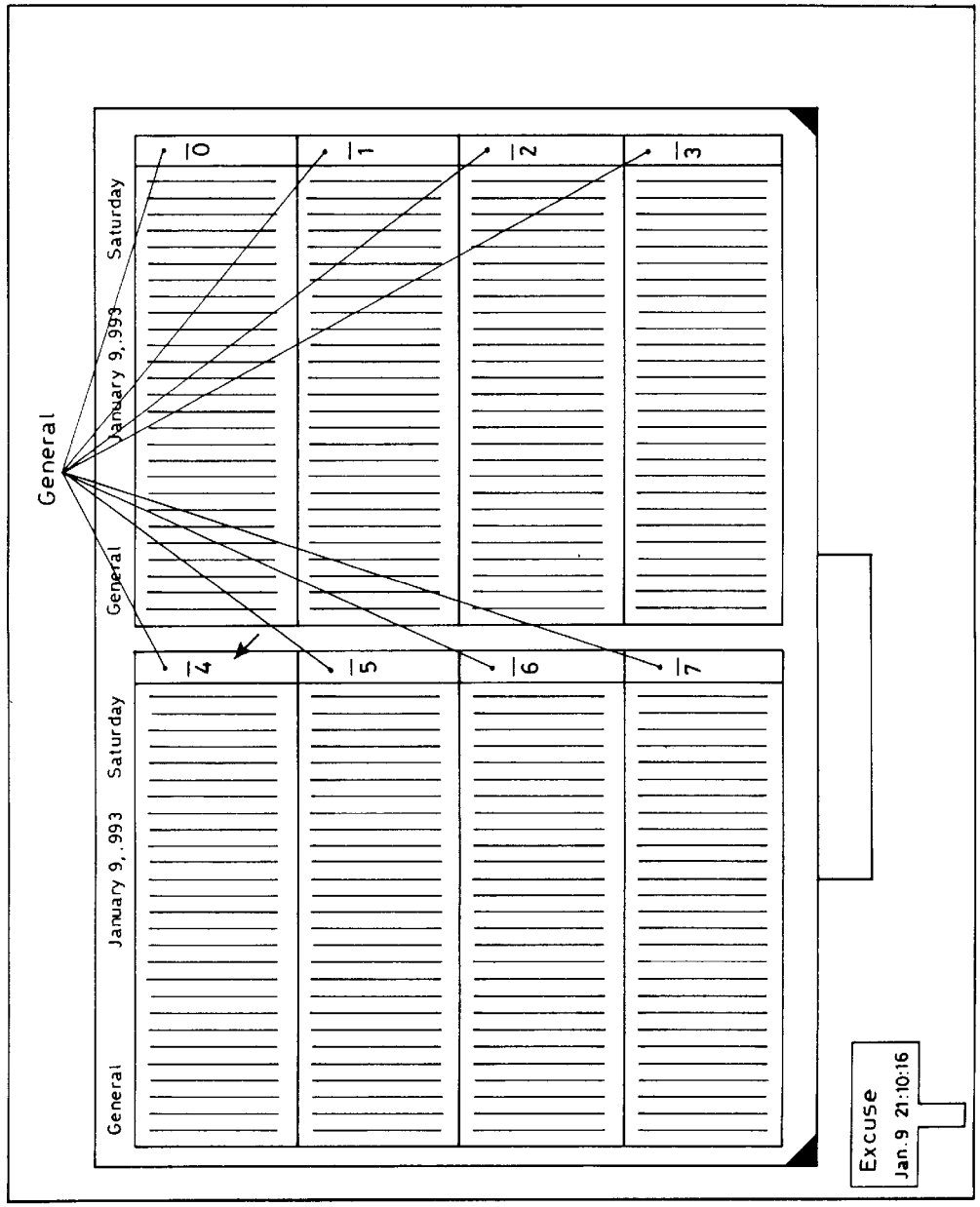
FIG. 21 represents an example of a generated screen of an excuse icon.

(2) The system goes back the track up to the time point when competition occurred and generates Excuse icon as shown in FIG. 21. In FIG. 21, the icon "Excuse" at the left under is the Excuse icon.

Figure 22:
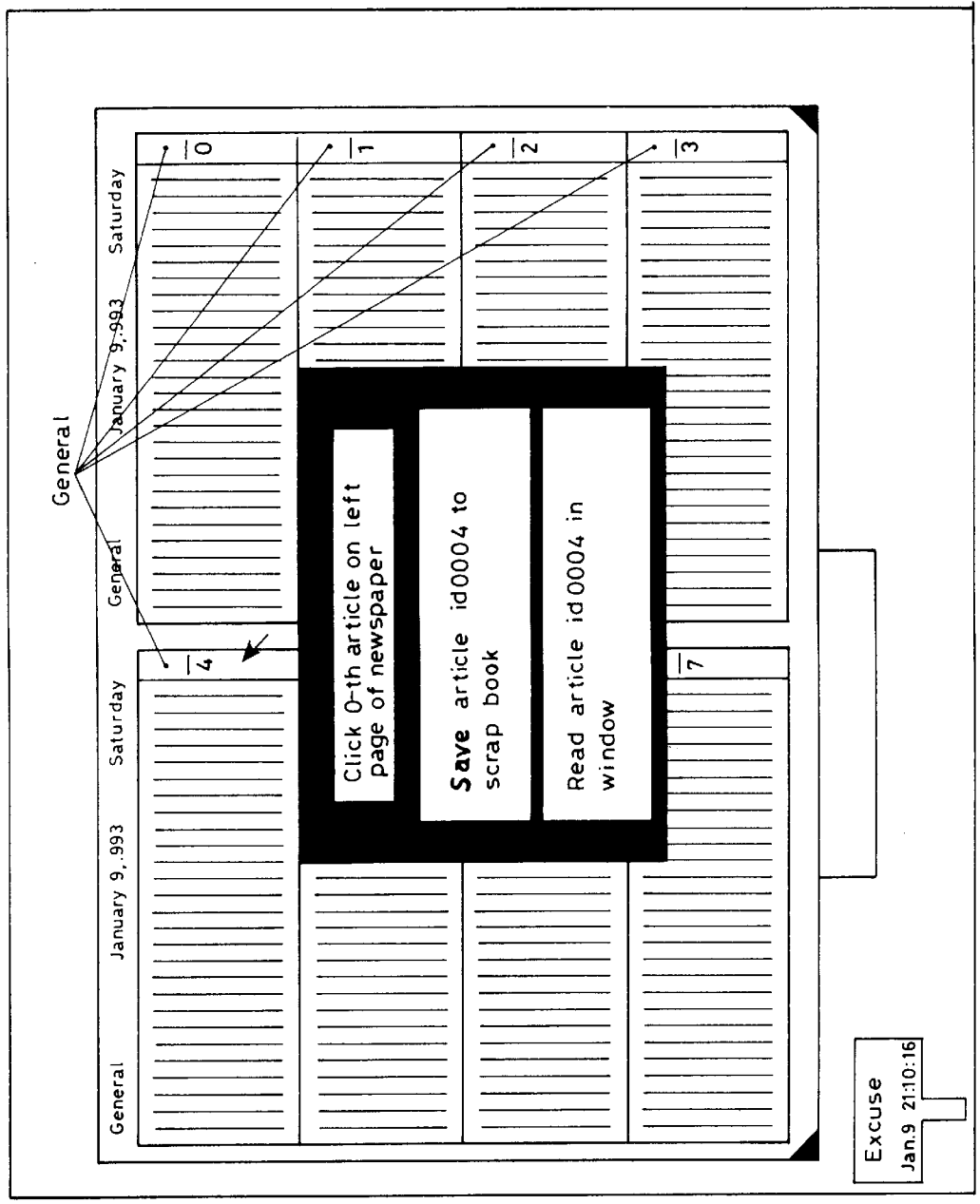
FIG. 22 shows an example of a screen selected by the user.

(3) The user may leave Excuse icon as it is. In this case, if the user clicks newspaper icon again, all possible choices are presented to the user as shown in FIG. 22, and the user is requested to select the plan.

Figure 23:
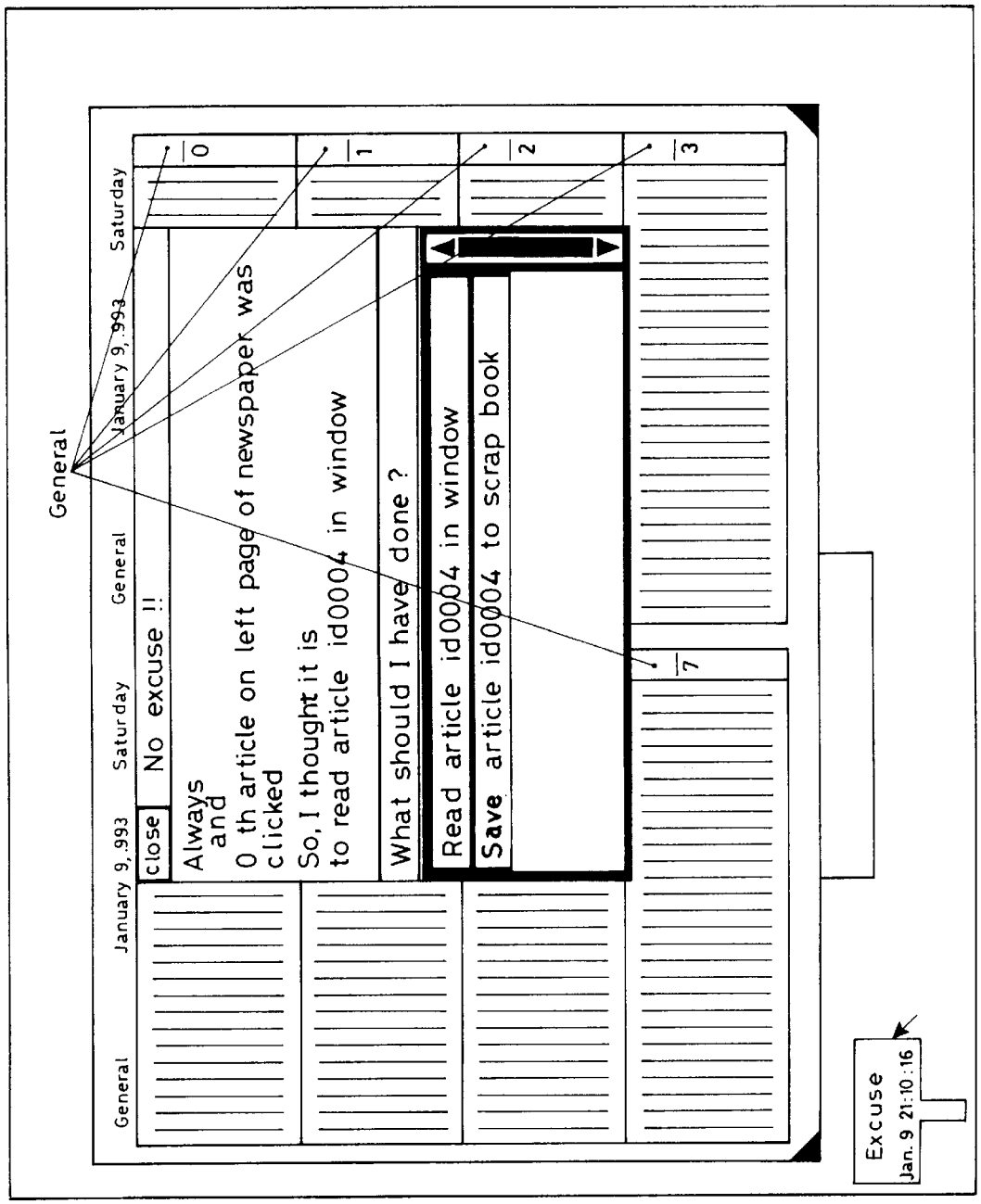
FIG. 23 shows an example of a screen for explaining reasons of context dependent processing by excuse window.

(4) When the user clicks Excuse icon, the system presents Excuse window as shown in FIG. 23. Excuse window presents the context estimated from operation of the user as reason to eliminate competition and presents a list of the possible selections.

(5) If, from the list of selections, the message:

---
[save the article of id0004 to scrap book]

Figure 24:
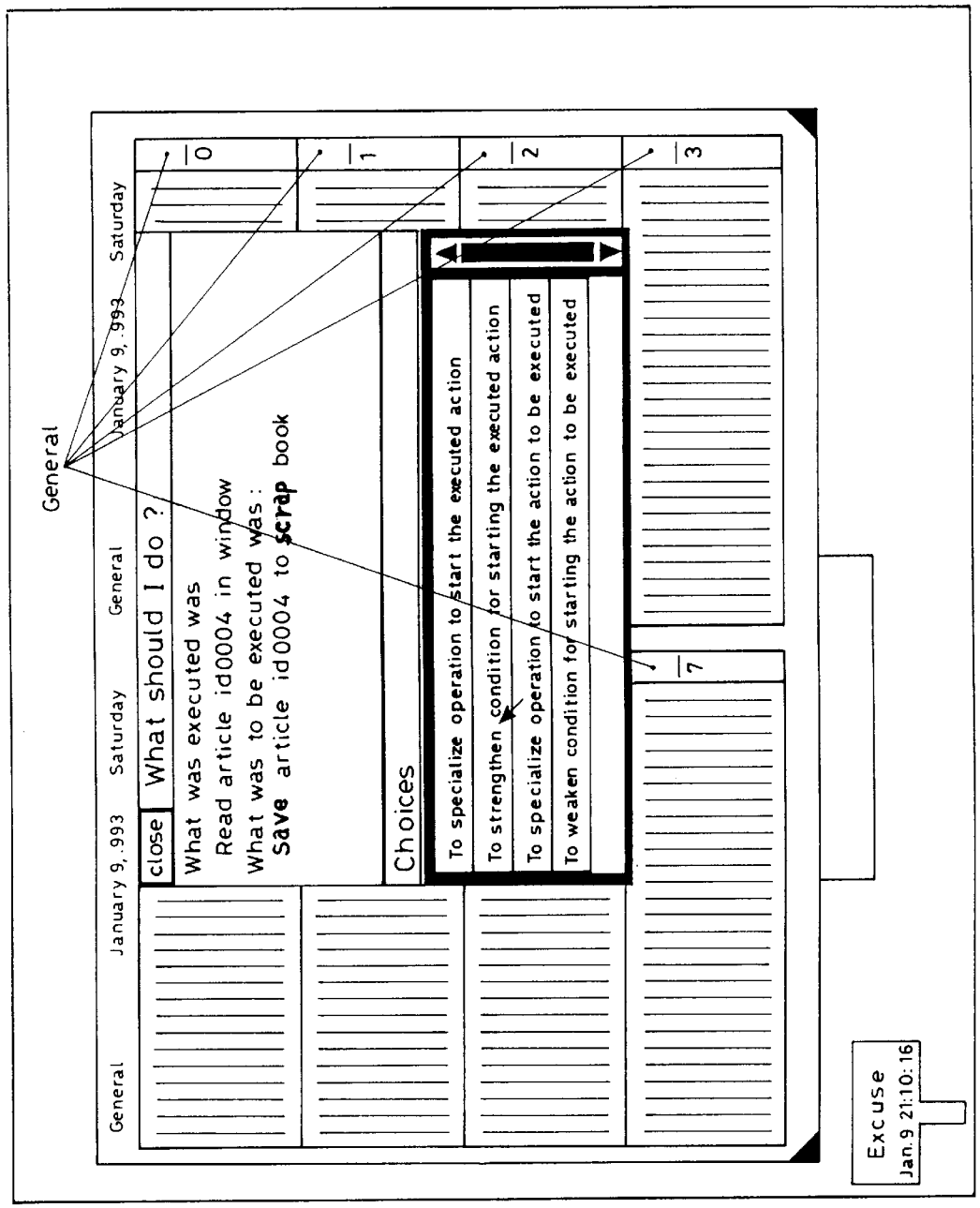
FIG. 24 represents an example of a screen for initiating customizing by customize window.
Figure 25:
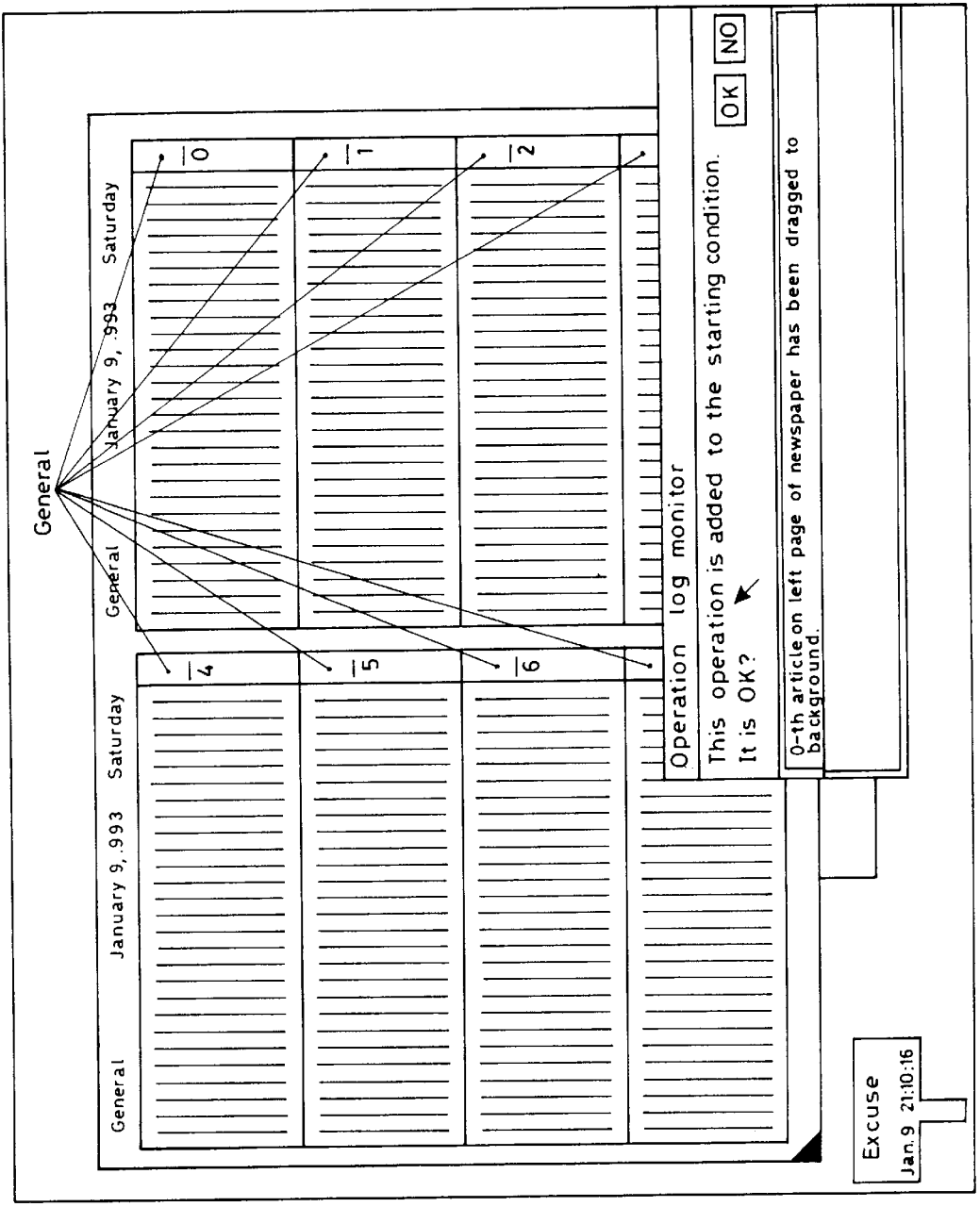
FIG. 25 shows an example of a screen in demonstration mode.

--- is selected, Customize window is opened as shown in FIG. 24, and it is now possible to customize. Here, if an approach to specialize operation is selected, the system is turned to demonstration mode as shown in FIG. 25 and requests concrete operation to the user. For example, if the message:

---
[save the article of id0004 to scrap book]

--- is started, it can be corrected in such manner that the operation:

---
[drag 0-th article on left page of the newspaper to background].

Figure 26:
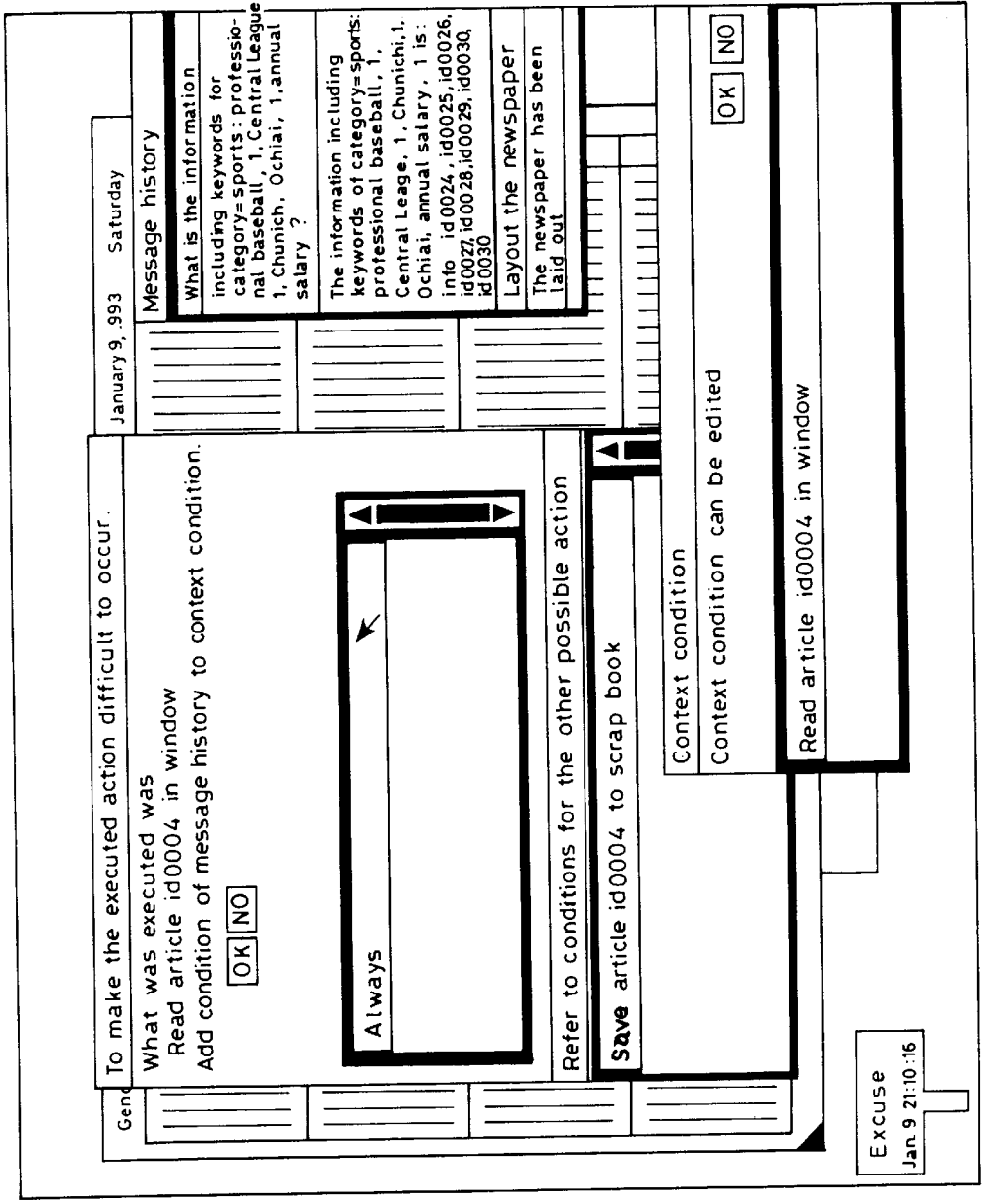
FIG. 26 represents an example of a screen for reinforcing context conditions.

When a choice to strengthen the starting condition is selected, the user can customize by adding context conditions from the contexts of the past as shown in FIG. 26 to reduce the possibility of the starting of the action. For example, the designer of the scrap book designed a bid in such manner that:

[save the article of * to scrap book]

when the user again clicks the article which has been already read. However, if the designer of:

[read the article of * in window]
[always]

had sent "always" as context condition, the new function "scrap book" will not be started unless the user customizes it. The user can start the scrap book by strengthening the context condition of:

[read the article of * in window].

By picking up task phase description:

[the newspaper has been laid out]

from the task phase history, and by adding context condition:

[read the article of * in window], the user customizes in such manner that, if the article is clicked again on the newspaper, which was laid out for once, the scrap book can be started.

Figure 27:
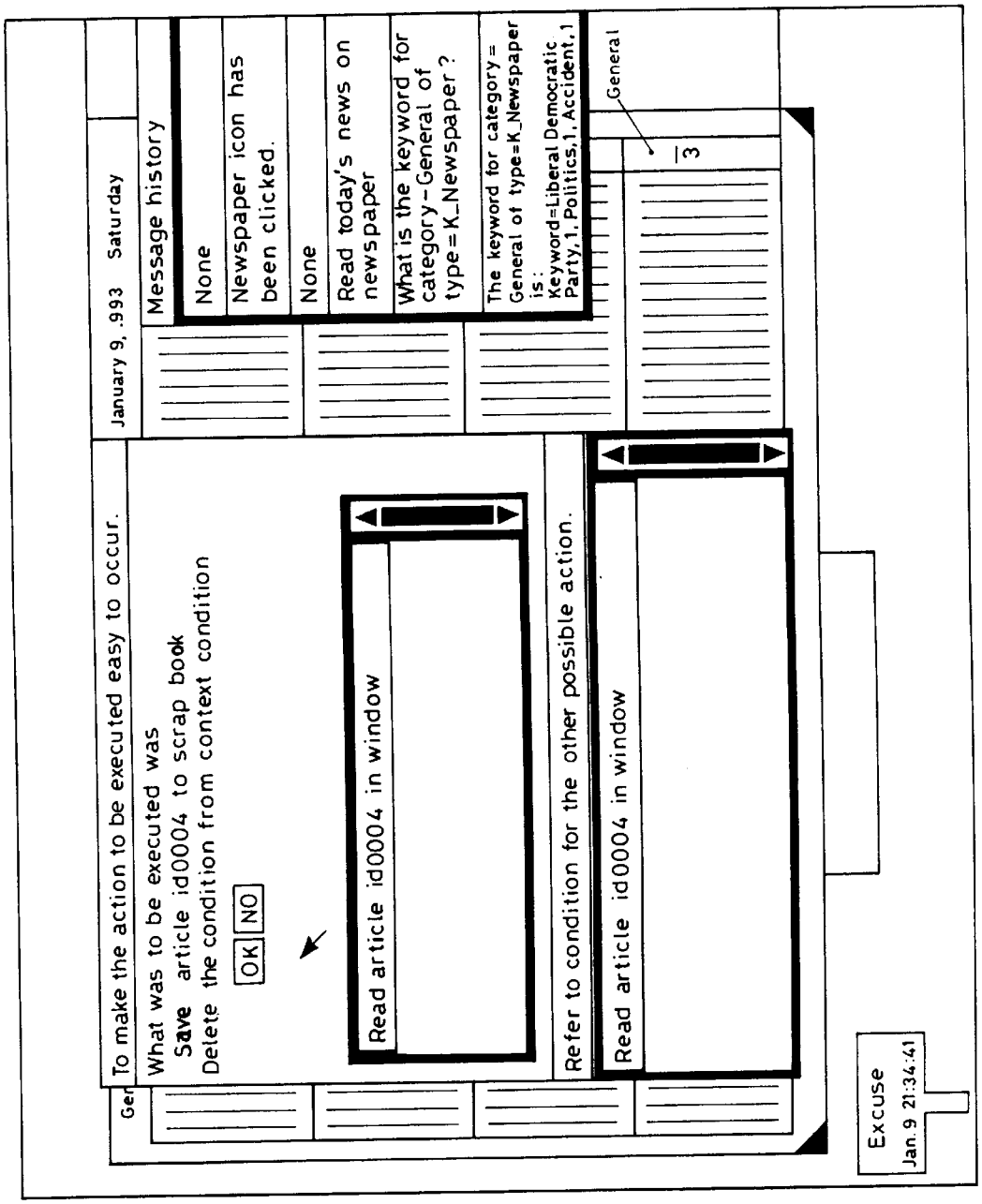
FIG. 27 shows an example of a screen for alleviating context conditions.

In case a choice to weaken the starting condition is selected, the user can delete the context condition and make the desirable action more likely to occur as shown in FIG. 27.

Figure 28:
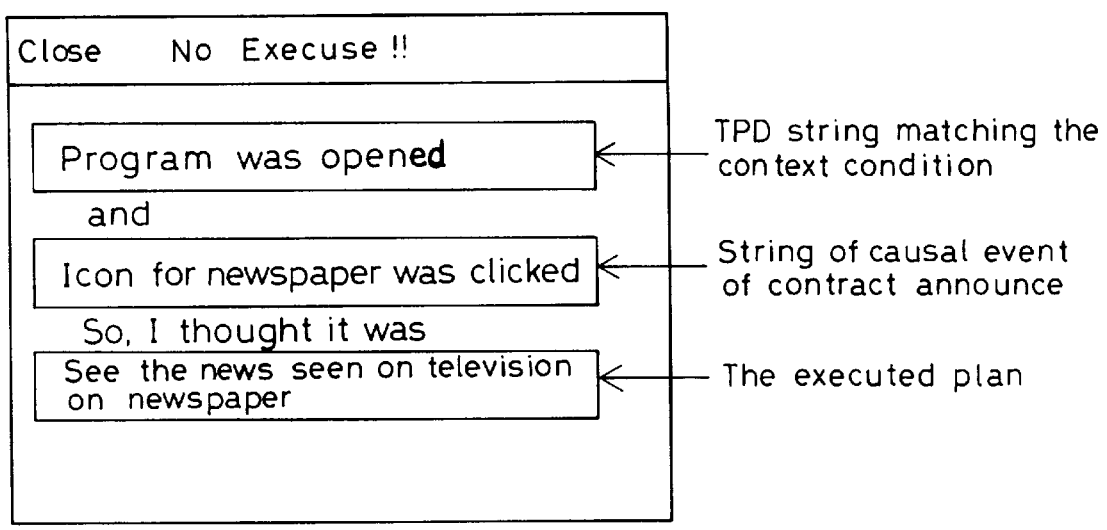
FIG. 28 shows an example of a screen for explaining reasons of context dependent processing.

Next, description will be given on an example of designing for Excuse-Customize processing. FIG. 28 represents an example of a screen for explaining the context dependent processing.

The mechanism for explaining the context dependent processing to the user and by which the user customizes context dependent processing, can be implemented by the function to convert TPD of the dialog manager agent 105 to the format legible by the user and by TPD history accumulated by the studio manager agent 106.

The dialog manager agent 105 converts the information of task phase description layer 102 to the information of the user layer 101. For example, to TPD of Metaphor Class= "Newspaper", the conversion is performed in the following character strings:

| Task | Phase | Form legible for user |
|---|---|---|
| "Click Left Page/ 3rd Article" | "Completed" | 3rd article on left page of newspaper was clicked. |
| "Go Page 3" | "Announced" | Move the newspaper to 3 page. |

-continued

| Task | Phase | Form legible for user |
|---|---|---|
| "Focus New Article ID3131" | "Completed" | Article ID3131 of newspaper was focused. |
| "Read Today's News" | "Announced" | Read today's news on newspaper |

The explanation of the reasons for the context dependent processing to the user can be prepared, from TPD history accumulated by the "studio manager" agent 106 shown in FIG. 28, by string of TPD matching the context condition of successful bid, by string of TPD, i.e. causal event of the applicable contract announce, and by the plan, which was successfully bid and executed.

As it is evident from the above description, agent groups comprise work memory area access procedure groups for giving and taking task phase description via studio, a studio manager agent 106 for managing history of task phase description delivered to the studio as context information, a bid arbiter agent for bid evaluation in contract net protocol using the accumulated context information, and a dialog manager agent for explaining the course of context dependent processing to the user and for providing means to customize the context dependent processing to the user, whereby module groups are operated in response to mutual contexts as the new agents are participated in contract bidding and bid arbiter evaluates bid according to the context managed by the studio manager agent. Thus, it is possible to take note of the task model (knowledge relating to task execution of the user and possessed by the system), which is a part of an agreement between user and system, and to provide a mechanism to utilize functions of the newly added modules while maintaining the agreement between user and system as much as possible when the new modules are added. For this reason, it is possible to integrate the newly added partial task model to customized task model and to utilize functions of the newly added module without changing the knowledge of the user relating to operation and feedback and to solve most of the task request of the user. Moreover, it is possible for the user and the interface architecture to combine a part of the partial task model or to change and customize it, and to utilize the functions of the existing software modules from the newly added partial task model, to utilize the functions of the newly added software module from the existing partial task model or customized task model, and to refer to the context during execution of the newly added module from the existing partial task model.

I claim:

1. An information processing system for architecture model for interfacing with humans, said architectural model having a plurality of software modules divided into independent element functions, and a work memory area for reading and writing various information as a shared medium, said information processing system comprising:

work memory area management means for managing history of task phase descriptions delivered to the work memory area as context information;

a bid arbiter means, operably coupled to said work memory area management means, for receiving bids in a contract net protocol, for receiving context information accumulated by said work memory area management means, for evaluating bids in said contract net protocol using the context information, and for performing condition branching based on the bid evaluation in a contract net protocol;

a dialog manager means for explaining a course of processing to a user and for providing means to customize the processing to the user, said processing being context information dependent, wherein said software modules communicate with each other by inputting and outputting said task phase descriptions to and from the work memory area by way of said work memory area management means, wherein said software modules operate based on the results of the bid evaluation, and wherein contract bidding is executed in accordance with a task to be executed when the bid is successfully awarded and in the form of bid-context condition strings showing a preceding processing needed for a planned task to be executed.

2. An information processing system for architecture model for interfacing with humans according to claim 1, wherein said software modules can be modified.

3. An information processing system for architecture model for interfacing with humans according to claim 1, wherein said software modules include metaphor environment modules, function core modules, and partial task modules.

4. An information processing system for architecture model for interfacing with humans according to claim 1, wherein the task phase descriptions which are inputted and outputted by said work memory area management means, comprise:

three character strings showing task, task phase and metaphor class/function class, a pointer to a metaphor environment module or a function core module, and a pointer to a partial task module, and two pointers to task phase descriptions.

5. An information processing system for architecture model for interfacing with humans according to claim 1, wherein said work memory area access procedures are functions corresponding to:

a task phase description expressing operation on input devices or on output devices, a task phase description expressing execution status of partial task module contract information between a metaphor environment module and a partial task module, a task phase description for dialog between a metaphor environment module and a partial task module, and a task phase description for dialog between a function core module and the partial task module.

6. An information processing system for architecture model for interfacing with humans according to claim 1, wherein said bid arbiter means evaluates a bid through a pattern matching of context condition strings of each bid and a task phase description history.

7. An information processing system for architecture model for interfacing humans according to claim 1, wherein said dialog manager means, operably coupled to said bid arbiter means, explains, to said user, said condition branching performed in said bid arbiter over said plurality of software modules in a format legible for the user, and when inconsistency occurs between the context assumed by the user and the context assumed by the vendor, said dialog manager means allows the user to interrupt the system and to instruct correction to the system.

* * * * *